United States Patent
Kesin

(10) Patent No.: US 10,942,957 B2
(45) Date of Patent: Mar. 9, 2021

(54) CONCEPT INDEXING AMONG DATABASE OF DOCUMENTS USING MACHINE LEARNING TECHNIQUES

(71) Applicant: Palantir Technologies Inc., Palo Alto, CA (US)

(72) Inventor: Max Kesin, Woodmere, NY (US)

(73) Assignee: Palantir Technologies Inc., Denver, CO (US)

( * ) Notice: Subject to any disclaimer, the term of this patent is extended or adjusted under 35 U.S.C. 154(b) by 355 days.

(21) Appl. No.: 15/898,066

(22) Filed: Feb. 15, 2018

(65) Prior Publication Data

US 2018/0173792 A1  Jun. 21, 2018

Related U.S. Application Data

(63) Continuation of application No. 15/159,622, filed on May 19, 2016, now Pat. No. 9,898,528, which is a (Continued)

(51) Int. Cl.
*G06F 16/33*     (2019.01)
*G06F 16/31*     (2019.01)
(Continued)

(52) U.S. Cl.
CPC .......... *G06F 16/334* (2019.01); *G06F 16/248* (2019.01); *G06F 16/282* (2019.01);
(Continued)

(58) Field of Classification Search
CPC ........ G06F 16/31; G06F 16/35; G06F 16/334; G06F 16/367; G06F 16/951
(Continued)

(56) References Cited

U.S. PATENT DOCUMENTS 6,980,984 B1* 12/2005 Huffman ............. G06F 16/3331
8,250,474 B2  8/2012 Peters et al.
(Continued)

FOREIGN PATENT DOCUMENTS

EP     3614275     2/2020

OTHER PUBLICATIONS

Notice of Allowance for U.S. Appl. No. 15/159,622 dated Oct. 6, 2017.
(Continued)

*Primary Examiner* — Shahid A Alam
(74) *Attorney, Agent, or Firm* — Knobbe, Martens, Olson & Bear, LLP

(57) ABSTRACT

Systems and techniques for indexing and/or querying a database are described herein. Discrete sections and/or segments from documents may be determined by a concept indexing system. The segments may be indexed by concept and/or higher-level category of interest to a user. A user may query the segments by one or more concepts. The segments may be analyzed to rank the segments by statistical accuracy and/or relatedness to one or more particular concepts. The rankings may be used for presentation of search results in a user interface. Furthermore, segments and/or documents may be ranked based on recency decay functions that distinguish between segments that maintain their relevance over time in contrast with temporal segments whose relevance decays quicker over time, for example.

14 Claims, 20 Drawing Sheets

Related U.S. Application Data continuation of application No. 14/746,671, filed on Jun. 22, 2015, now Pat. No. 9,348,920.

(60) Provisional application No. 62/095,445, filed on Dec. 22, 2014, provisional application No. 62/133,871, filed on Mar. 16, 2015.

(51) Int. Cl.

| | |
|---|---|
| *G06F 16/338* | (2019.01) |
| *G06F 16/93* | (2019.01) |
| *G06F 16/248* | (2019.01) |
| *G06F 16/951* | (2019.01) |
| *G06F 16/9535* | (2019.01) |
| *G06N 20/00* | (2019.01) |
| *G06F 16/40* | (2019.01) |
| *G06F 16/28* | (2019.01) |
| *G06F 16/35* | (2019.01) |
| *G06F 16/36* | (2019.01) |

(52) U.S. Cl.
CPC ............ *G06F 16/31* (2019.01); *G06F 16/338* (2019.01); *G06F 16/353* (2019.01); *G06F 16/367* (2019.01); *G06F 16/40* (2019.01); *G06F 16/93* (2019.01); *G06F 16/951* (2019.01); *G06F 16/9535* (2019.01); *G06N 20/00* (2019.01)

(58) Field of Classification Search
USPC ........................................................ 707/723
See application file for complete search history.

(56) References Cited

U.S. PATENT DOCUMENTS

| | | | |
|---|---|---|---|
| 8,656,478 B1 | 2/2014 | Forristal | |
| 9,348,920 B1 | 5/2016 | Kesin | |
| 9,817,563 B1 | 11/2017 | Stokes et al. | |
| 9,898,528 B2 | 2/2018 | Kesin | |
| 2008/0189408 A1 | 2/2008 | Cancel et al. | |
| 2008/0077570 A1* | 3/2008 | Tang | G06F 16/3346 |
| 2008/0270391 A1 | 10/2008 | Newbold et al. | |
| 2008/0301094 A1* | 12/2008 | Zhu | G06F 16/34 |
| 2011/0202500 A1 | 8/2011 | Warn et al. | |
| 2012/0004904 A1* | 1/2012 | Shin | G06F 16/35 |
| | | | 704/9 |
| 2013/0159340 A1* | 6/2013 | Blanco | G06F 16/9535 |
| | | | 707/769 |
| 2013/0297619 A1* | 11/2013 | Chandrasekaran | G06Q 10/10 |
| | | | 707/748 |
| 2014/0019119 A1 | 1/2014 | Liu et al. | |
| 2014/0129261 A1* | 5/2014 | Bothwell | G06N 20/00 |
| | | | 705/4 |
| 2014/0195515 A1* | 7/2014 | Baker | G06F 16/26 |
| | | | 707/722 |
| 2014/0195916 A1 | 7/2014 | Kwan et al. | |
| 2016/0098485 A1 | 4/2016 | Burke et al. | |

OTHER PUBLICATIONS

Official Communication for New Zealand Application No. 627962 dated Aug. 5, 2014.
Official Communication for New Zealand Application No. 628840 dated Aug. 28, 2014.
Official Communication for U.S. Appl. No. 14/859,882 dated Feb. 8, 2018.
Official Communication for U.S. Appl. No. 15/159,622 dated May 10, 2017.
Official Communication for U.S. Appl. No. 15/159,622 dated Feb. 24, 2017.
Official Communication for U.S. Appl. No. 15/293,140 dated Jan. 11, 2018.
Official Communication for European Patent Application No. 15201881.8 dated Jul. 16, 2018.
Official Communication for European Patent Application No. 19204051.7 dated Jan. 16, 2020.

* cited by examiner

400 — 402 — CA Monthly

Monthly Updates

410A { Update 1

410B { Update 2

CA in tech

420 {
That, it was certain the prisoner had, for longer than that, been in the habit of passing and repassing between France and England, on secret business of wich he
  450A   450B
could give no honest account. That, if it were in the nature of traitorous ways to thrive(which happily it never was), the real wickedness and guilt of his business might have remained undiscovered. That Providence, however, had put it into the
                            450C
heart of a person who was beyond fear and beyond reproach, to fert out the nature of the prisoner's schemes, and, struck with horror, to disclose them to his Majesty's Chief Secretary of State and most honourable Privy Council. That, this
                                                              450D
patriot woul be produced before them. That, his position and attitude were, on the whole, sublime. That, he had been theprisioner's friend, but, at once in an
         450E
auspicious and an evil hour detecting his infamy, had resolved to immolate the traitor he could no longer cherish in his bosom, on the sacred altar of his
                                                                450F
country. That, if statues were decreed in Britain, as in ancient Greece an Rome,
                                        450G
to public benefactors, this shining citizen would assuredly have had one. That, as they were not so decreed, he probably would not have one, That, Virtue, as had been
                                                                    450H
observed by the poets (in many passages which he well knew the jury would have,
                           450I
word for word, at the tips of their tongues; whereat the jury's countenances...

FIG. 4

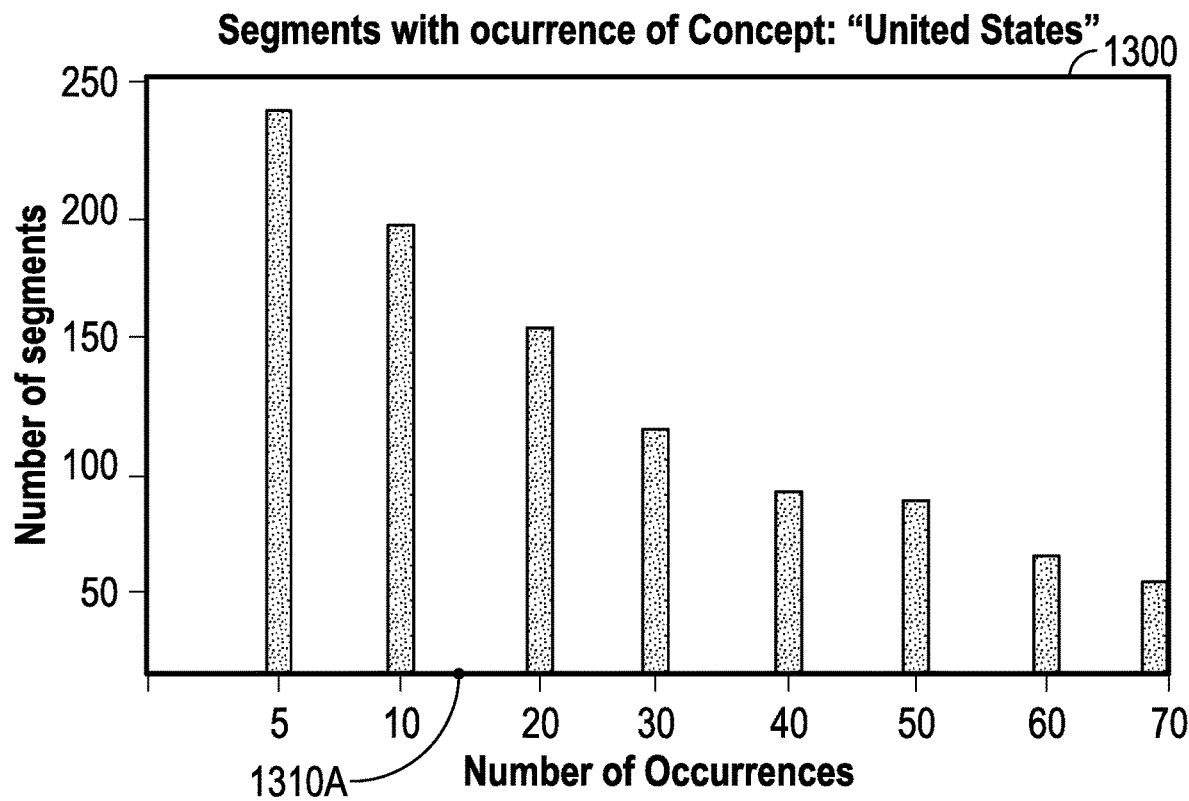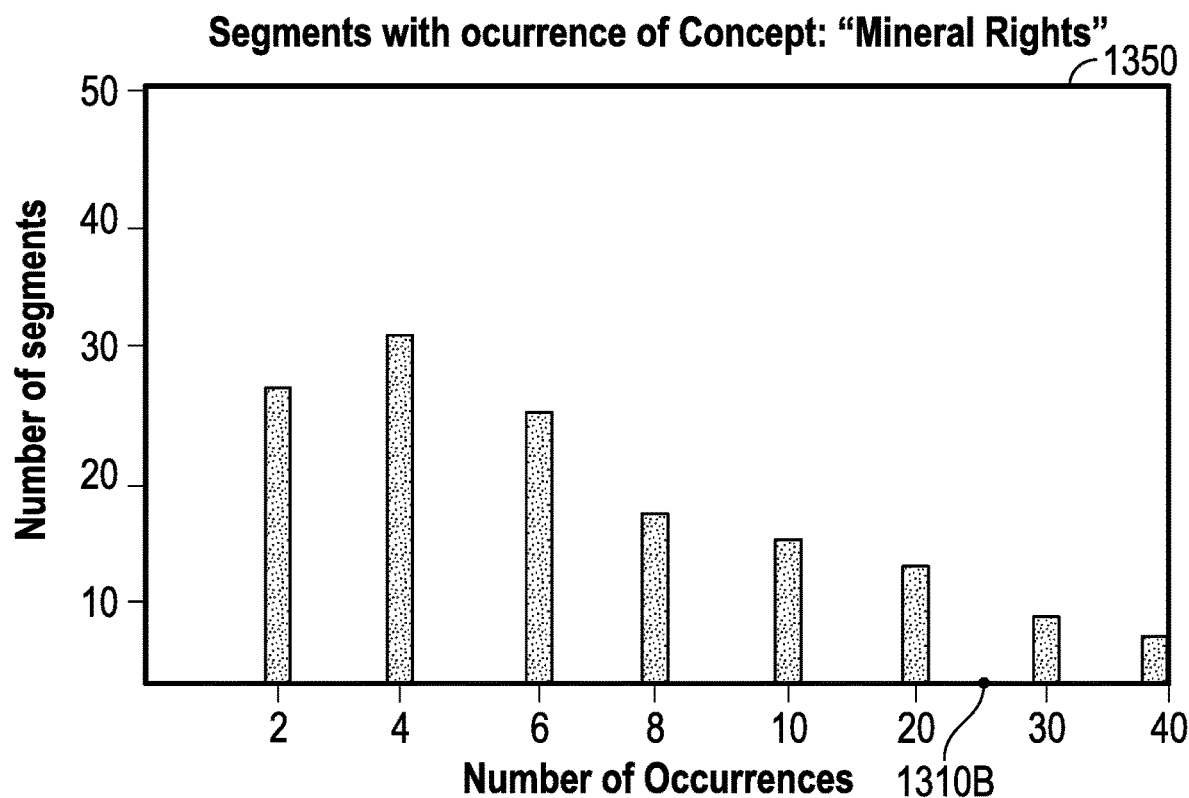
FIG. 13

Such law should apply to Alaska. It is now proposed to dispose of agricultural lands as such, and at the same time to reserve for other disposition the treasure of coal and oil in the United States. This may be best accomplished by separating the right to mine from the title to the surface in Alaska, giving the necessary use of so much of the latter as may be required for the extraction of the deposits. The surface might be disposed of as agricultural land under the general agricultural statutes in America, while the coal or other mineral could be disposed of by lease on a royalty basis, with provisions requiring a certain amount of development each year; and in order to prevent the use and cession of such lands with others of similar character so as to constitute a monopoly forbidden by law, the lease should contain suitable provision subjecting to forfeiture the interest of persons participating in such monopoly. It should be done by the Goverment's Interior Department through the Geological Survey.

FIG. 15

CONCEPT INDEXING AMONG DATABASE OF DOCUMENTS USING MACHINE LEARNING TECHNIQUES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application is a continuation of U.S. patent application Ser. No. 15/159,622 entitled "Concept Indexing Among Database of Documents Using Machine Learning Techniques" filed May 19, 2016, which is a continuation of U.S. patent application Ser. No. 14/746,671 entitled "Concept Indexing Among Database of Documents Using Machine Learning Techniques" filed Jun. 22, 2015, which claims benefit of U.S. Provisional Patent Application Ser. No. 62/095,445 entitled "Concept Indexing Among Database of Documents Using Machine Learning Techniques" filed Dec. 22, 2014 and U.S. Provisional Patent Application Ser. No. 62/133,871 entitled "Concept Indexing Among Database of Documents Using Machine Learning Techniques" filed Mar. 16, 2015. Each of these applications are hereby incorporated by reference herein in their entireties.

BACKGROUND

In the area of computer-based platforms, documents may be searched based on keywords.

SUMMARY

The systems, methods, and devices described herein each have several aspects, no single one of which is solely responsible for its desirable attributes. Without limiting the scope of this disclosure, several non-limiting features will now be discussed briefly, which may be combined in various embodiments.

In some embodiments, a computing system for identifying concepts of interests to a user in specific segments of a plurality of documents each having one or more separate segments. The computing system may include one or more hardware computer processors configured to execute software instructions. The computing system may further include one or more storage devices storing software instructions configured for execution by the one or more hardware computer processors. When executed, the software instructions may cause the computing system to identify a plurality of segments within the plurality of documents, wherein at least some of the plurality of documents each include two or more segments, wherein identifying segments includes analyzing the plurality of documents for features indicative of possible section headings, including at least one of: casing, spacing, punctuation, common words, or groups of words. When further executed, the software instructions may cause the computing system to access a concept hierarchy including a plurality of concepts of interest to the user, the concept hierarchy further including concept keywords associated with respective concepts. When further executed, the software instructions may cause the computing system to, for each concept, determine statistical likelihoods that respective identified segments are associated with the concept. The statistical likelihoods may each be based on at least one of, for each combination of a particular concept and a particular segment: a quantity of the particular concept keywords in the particular segment; a density of the particular concept keywords in the particular segment; or a distribution of the particular concept keywords within the particular segment. When further executed, the software instructions may cause the computing system to store in a concept indexing database the plurality of concepts and the statistical likelihoods that respective concepts are in each of the determined respective segments, wherein the concept indexing database is usable to identify, in response to a user query for a specific concept, a ranked listing of one or more segments having highest statistical likelihoods of being associated with the specific concept.

In some embodiments, a computing system for information retrieval comprises one or more hardware computer processors programmed, via software instructions. When executed, the software instructions may cause the computing system to access a plurality of documents, each document from the plurality of documents associated with one or more words. When further executed, the software instructions may cause the computing system to identify, from the plurality of documents, a plurality of segments, wherein each segment of the plurality of segments is identified based at least on analyzing one or more features of each document from the plurality of documents, the one or more features comprising at least one of casing, spacing, punctuation, or common words, and wherein each segment of the plurality of segments is at least associated with a portion of a respective document. When further executed, the software instructions may cause the computing system to access a plurality of concepts of interest for identification within the plurality of segments. When further executed, the software instructions may cause the computing system to access a mapping from respective ones of the plurality of concepts to respective keywords from an initial keyword set. When further executed, the software instructions may cause the computing system to determine a first set of segments from the plurality of segments based at least on the initial keyword set, respective ones from the initial keyword set corresponding to respective words from the first set of segments. When further executed, the software instructions may cause the computing system to determine a related keyword set based at least on identifying respective words from the first set of segments that were not present in the initial set of keywords. When further executed, the software instructions may cause the computing system to update the mapping to include associations between respective ones of the plurality of concepts and respective related keywords. When further executed, the software instructions may cause the computing system to determine a second set of segments from the plurality of segments based at least on the related keyword set, respective ones from the related keyword set corresponding to respective words from the second set of segments. When further executed, the software instructions may cause the computing system to index the plurality of concepts, wherein respective ones of the plurality of concepts are associated with at least one segment from the first set of segments or the second set of segments, wherein the association between respective ones of the plurality of concepts and the at least one segment is based at least on the mapping. When further executed, the software instructions may cause the computing system to store the index in a non-transitory computer storage.

In some embodiments, computer-implemented method for information retrieval comprises identifying a plurality of segments within a plurality of documents, wherein identifying segments includes analyzing the plurality of documents for features indicative of possible section headings, including at least one of: casing, spacing, punctuation, common words, or groups of words. The method may further comprise accessing a concept hierarchy including a plurality of concepts of interest to the user, the concept hierarchy further including concept keywords associated with respective concepts. The method may further comprise, for each concept, determining statistical likelihoods that respective identified segments are associated with the concept, the statistical likelihoods may each be based on at least one of, for each combination of a particular concept and a particular segment: a quantity of the particular concept keywords in the particular segment; or a distribution of the particular concept keywords within the particular segment. The method may further comprise generating an index from the plurality of concepts and the statistical likelihoods that respective concepts are in each of the determined respective segments. The method may further comprise storing the index in a non-transitory computer storage.

BRIEF DESCRIPTION OF THE DRAWINGS

Certain aspects of the disclosure will become more readily appreciated as those aspects become better understood by reference to the following detailed description, when taken in conjunction with the accompanying drawings.

FIG. 4 illustrates another example document that may be processed by the concept indexing system, according to some embodiments of the present disclosure.

FIG. 13 are diagrams illustrating example metadata and/or histogram data for search concepts, according to some embodiments of the present disclosure.

FIG. 15 illustrates another example document that may be processed and/or analyzed by the concept indexing system, according to some embodiments of the present disclosure.

DETAILED DESCRIPTION

Figure 1:
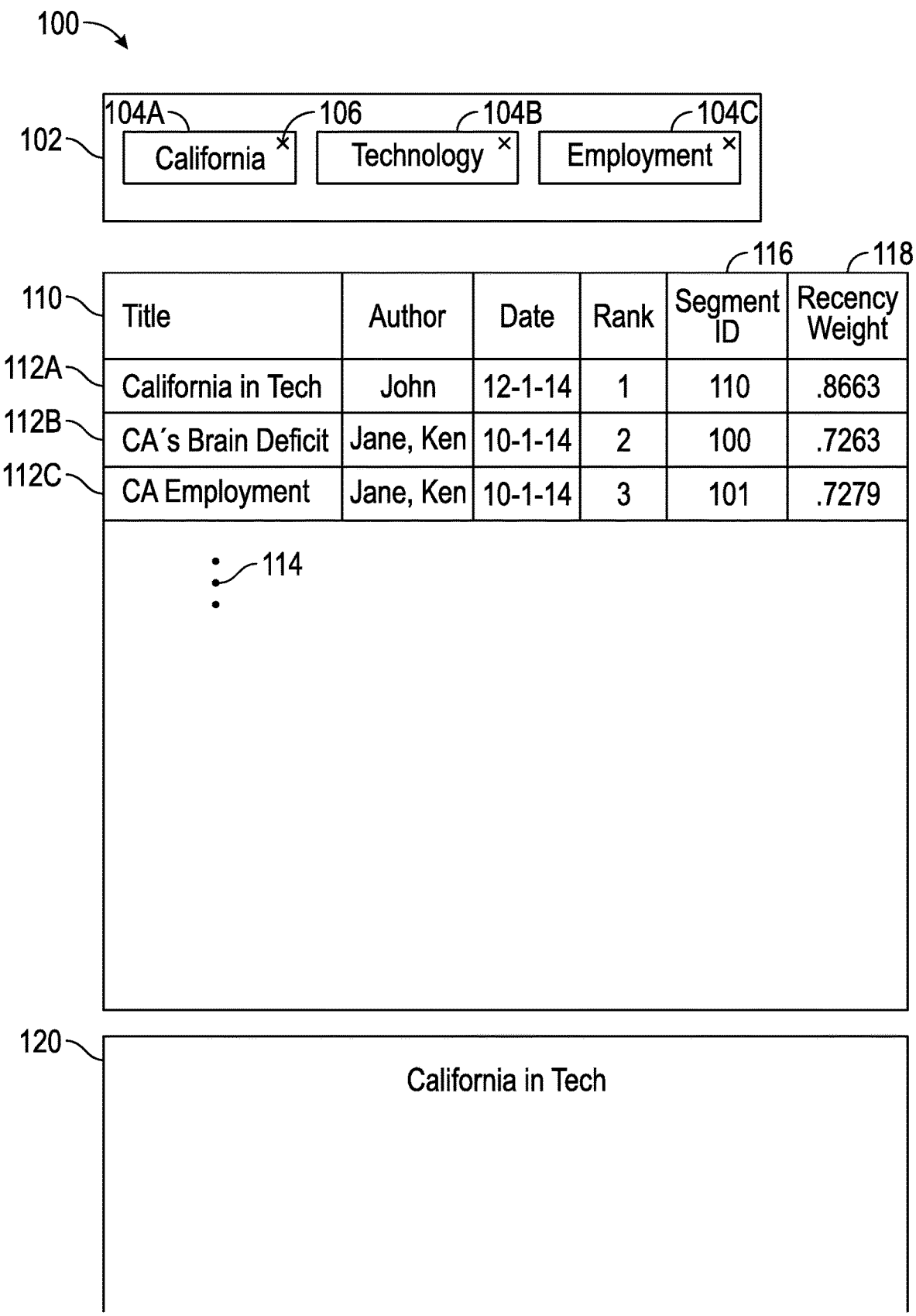
FIG. 1 illustrates an example user interface of the concept indexing system, according to some embodiments of the present disclosure.

Documents may be searchable with the goal of improving particular aspects of information retrieval. For example, in a computer-based context, documents may be searched based on words. A researcher that wants to learn more about a subject may submit a search query of search terms to an informational retrieval or database system. The system may return search results or documents that include the search terms to the user.

Researchers may be interested in querying a collection, library, and/or database of documents. For example, a graduate student at a research organization may be interested in learning more about one or more topics. In another example use case, a financial analyst at a bank and/or investment firm may be interested in querying a body of internal documents to develop new investment ideas and/or strategies. The researchers at these organizations and/or institutions may be interested in querying documents and/or portions of documents based on higher-level categories and/or concepts in place of and/or in addition to standard keyword searching and/or information retrieval techniques. It will be appreciated that the systems and methods described herein may be used in any number of settings, such as any area pertaining to information retrieval and/or research, e.g., online search, search engines, and/or library retrieval systems.

In addition to traditional keyword based searching, disclosed herein are systems and methods for analyzing, indexing, and/or querying documents, a library of documents, portions of documents, and/or a database. Using the techniques and systems disclosed herein, sections and/or segments of interest to a user may be determined from one or more documents. The segments and/or documents may be indexed by concept and/or higher-level category of interest to a user. The segments and/or documents may be further analyzed to rank the segments and/or documents by a statistical accuracy and/or likelihood of relatedness to one or more particular concepts and/or higher-level categories. Thus, the concept indexing system disclosed herein may distinguish between segments of a document that include a keyword of interest, but are primarily focused on another topic that only peripherally is associated with the keyword, from other segments that are primarily focused on the keyword of interest. Furthermore, segments and/or documents may be ranked based on recency decay functions that distinguish between basic and temporal segments and/or documents. In other words, the concept indexing system may distinguish between segments that relatively maintain their relevance over time in contrast with temporal segments whose relevance decays more rapidly over time.

In some embodiments, a concept indexing system may process and/or access a library of documents and/or articles. Documents may be compound, such as including multiple sections and/or segments, which may be indicated by headings, spacing, punctuation, styling, and/or other features. A user may be interested in specific segments of a document, and, therefore, it may be advantageous for the concept indexing system to allow the retrieval of specific segments. Another advantage of segregating a document into discrete segments under sections is that the concept indexing system may provide enhanced and/or refined searching. For example, if a researcher is interested in agriculture in Norway, then the user may search for both topics and/or concepts "Norway" and "Agriculture." In the same example, a specific document, Document A, may include a section about current politics in Norway and another section about agriculture in France. In some embodiments, the concept indexing system may not provide a search result for Document A in response to the search "Norway" and "Agriculture" because the system is configured to query the database by segment instead of document, for example. There may be no search result for the document because the document does not include a segment and/or section that discusses both Norway and agriculture and/or the database of segments and/or documents is indexed based on that level of granularity in mind. Another aspect of concept indexing is that segments and/or documents may be categorized by type. For example, segments may be either temporal or more basic and/or fundamental in nature. For example, a segment may be associated with a monthly update about current events. In the same document as the temporal segment, another portion of the document may be associated with more basic and/or fundamental principles about science, math, politics, and/or the economy. For example, the beginning section of the document may outline the fundamental principles that the article is based on. Thus, it may be advantageous for the concept indexing system to differentiate and/or rank segments based on the type of segment.

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

A "document" refers to any collection of words and/or text. Non-limiting examples of documents include electronic documents, word processing documents, spreadsheets, text files, a Portable Document Format ("PDF"), news articles, headlines, image data, physical, tangible, and/or paper documents, and any other type of content that may be associated with any type of textual content.

A "segment" refers to any portion of one or more documents. For example, a segment may include a section and/or portion of a document as indicated by headlines, paragraphs and/or some other formatting. A document may include multiple segments and/or a segment may include more than two portions of separate documents.

A "concept" may refer to a label, category, word, groups of words, and/or tag that references to an idea, notion, or category of information beyond just a keyword associated with such idea, notion, or category. A concept may be defined based on keywords, as well as other attributes discussed herein. A concept may be associated with a document, a portion of a document, and/or segment. For example, a segment may be associated with the concept "Agricultural Equipment" based on the text and/or meaning of the segment, even though the text "Agricultural Equipment" does not directly appear in the segment. In some embodiments, a document and/or segment may be associated with one or more concepts.

It will be appreciated that while the below examples refer to documents in English the systems and methods described herein may support other languages and/or character sets than English.

Example Query Interface

Figure 2:
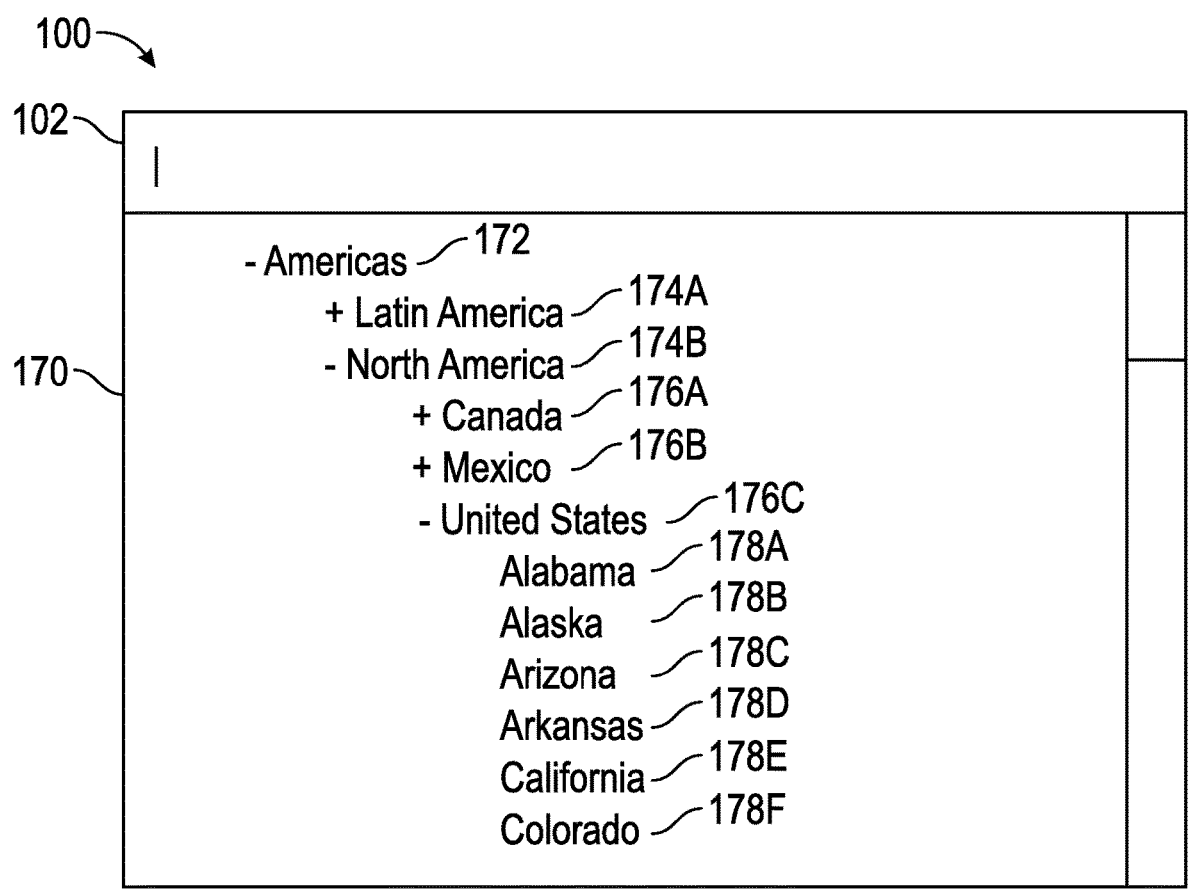
FIG. 2 illustrates another example user interface of the concept indexing system and/or a concept hierarchy, according to some embodiments of the present disclosure.

FIGS. 1 and 2 illustrate example user interfaces of the concept indexing and/or querying system, according to some embodiments of the present disclosure. In some embodiments, the user interfaces described below may be displayed in any suitable computer system and/or application, for example, in a web browser window and/or a standalone software application, among others. Additionally, the functionality and/or user interfaces of the system as shown in FIGS. 1 and/or 2 may be implemented in one or more computer processors and/or computing devices, as is described with reference to FIG. 19. Furthermore, FIG. 2 may illustrate a collection of concepts and/or hierarchy of concepts, which may not be displayed in such a user interface.

Referring to FIG. 1, the example user interface 100 includes input area 102, results area 110, and/or a segment area 120. In operation, a researcher may view segments indexed by one or more concepts and/or the concepts may be queryable through user interface 100. In this example, the concepts 104A-C are each associated with segments 112A-C shown in the results area 110. Ellipsis 114 may illustrate that more segments are presented in results area 110 other than what is illustrated.

Referring to FIG. 2, example user interface 100 illustrates a concept selection area 170. As illustrated, upon selecting of input area 102 by a user, concept selection area 170 may be presented to the user interface 100. Concept selection area may include concepts and/or a hierarchy of concepts. For example, the hierarchy of concepts may include a top node 172, "Americas," with sub-nodes 174A-B, "Latin America," "North America," respectively, and/or sub-sub-nodes 176A-C, etc. In some embodiments, each node within the concept hierarchy and/or tree may correspond to a concept, which may be selectable. In yet other embodiments, only the leaf nodes of the concept hierarchy may correspond to concepts that may be selected in user interface 100. The concepts selected within concept selection area 170 may be used to populate input area 102. For example, a selection of concept 178E may correspond to the selected concept 104A of FIG. 1. It will be appreciated that, in some embodiments, the presented concepts in user interface 100 may correspond to a list of concepts and/or may not correspond to a hierarchy.

In some embodiments, partial input within input area 102 may cause the concept selection area 170 to update. For example, text input, such as "tech" may cause the concept hierarchy and/or concept selection area 170 to dynamically update, such as including part of the concept hierarchy and/or collection matching the string and/or text "tech," such as the concept "Technology."

In some embodiments, selection of a top and/or root node may select and/or include all children and/or sub-nodes. For example, a selection of node 172 may include the selection of and/or cause the concept indexing system to process children nodes of node 172. Thus, in some embodiments, user interface 100 may present segments associated with the selected node and/or the children nodes of the selected node.

Returning to FIG. 1, example user interface 100 illustrates an operation to query a collection and/or library of documents and/or segments. For example, the database of documents and/or segments may be queried by user through input area 102 based on the selected concepts 104A-C, "California," "Technology," "Employment," respectively. In some embodiments, in response to selection of a concept, such as concept 104A, results area 110 may update dynamically. The database and/or system may be queried for segments and/or one or more result sets based on concepts 104A-C. For example, segments relating to each of the concepts and/or categories 104A-C are presented to the user. For example, the first result 112A, "California in Tech," is associated with all of the concepts 104A-C, such as California, technology, and employment. The segment corresponding to the entry 112A, titled "California in Tech," may be a section of an article describing employment opportunities in the technology area in California.

In some embodiments, results area 110 may present information resulting from a search query of the database. For example, results area 110 may include a table of search results columns. As illustrated, the columns may be associated with the title, one or more authors, a publication date, a rank, a segment identifier, a recency weight, and/or any other information and/or metadata associated with the segment and/or search result. In some embodiments, each column may be sorted in ascending/descending alphabetical, numerical, and/or any other order, which may be selected by a user using existing user interface and/or sorting functionalities. In some embodiments, each column may be filtered and/or searched by keyword, which may update the results area 110. For example, the results may be filtered by a particular author name and/or particular string in the title. It will be appreciated that some of the illustrative columns in results area 110 are optional and/or configurable. For example, columns 116 and 118, "segment ID" and "recency weight," respectively, may be configured to be shown to a system administrator for debugging purposes and/or may not be intended to be shown to an end user of the system, such as a researcher.

In some embodiments, results area 110 may present individual segments matching the search query. For example, segments 112B and 112C correspond to the same document. While the original document is titled "CA Employment," and that document may include dozens or more segments, the concept indexing system has analyzed and/or processed the document to determine that segments 112B-C, each with separate segment titles illustrated in the title column, each include discussion of "California," "Technology," and "Employment" concepts within those specific segments of the document.

As illustrated, in some embodiments, selection of a search result may cause a presentation and/or a preview of the associated segment in segment area 120. For example, a user may select entry and/or row 112A in user interface 102 to cause presentation of segment area 120. The segment and/or preview of a segment shown in segment area 120 may correspond to the entry and/or row 112A.

In some embodiments, it will be appreciated that the concept indexing and/or query system may support additional user interfaces. Additionally or alternatively, user interfaces of the concept indexing system may correspond to graphs, connected graphs, and/or other data visualizations of documents and/or segments not illustrated in FIG. 1 or 2.

Figure 3:
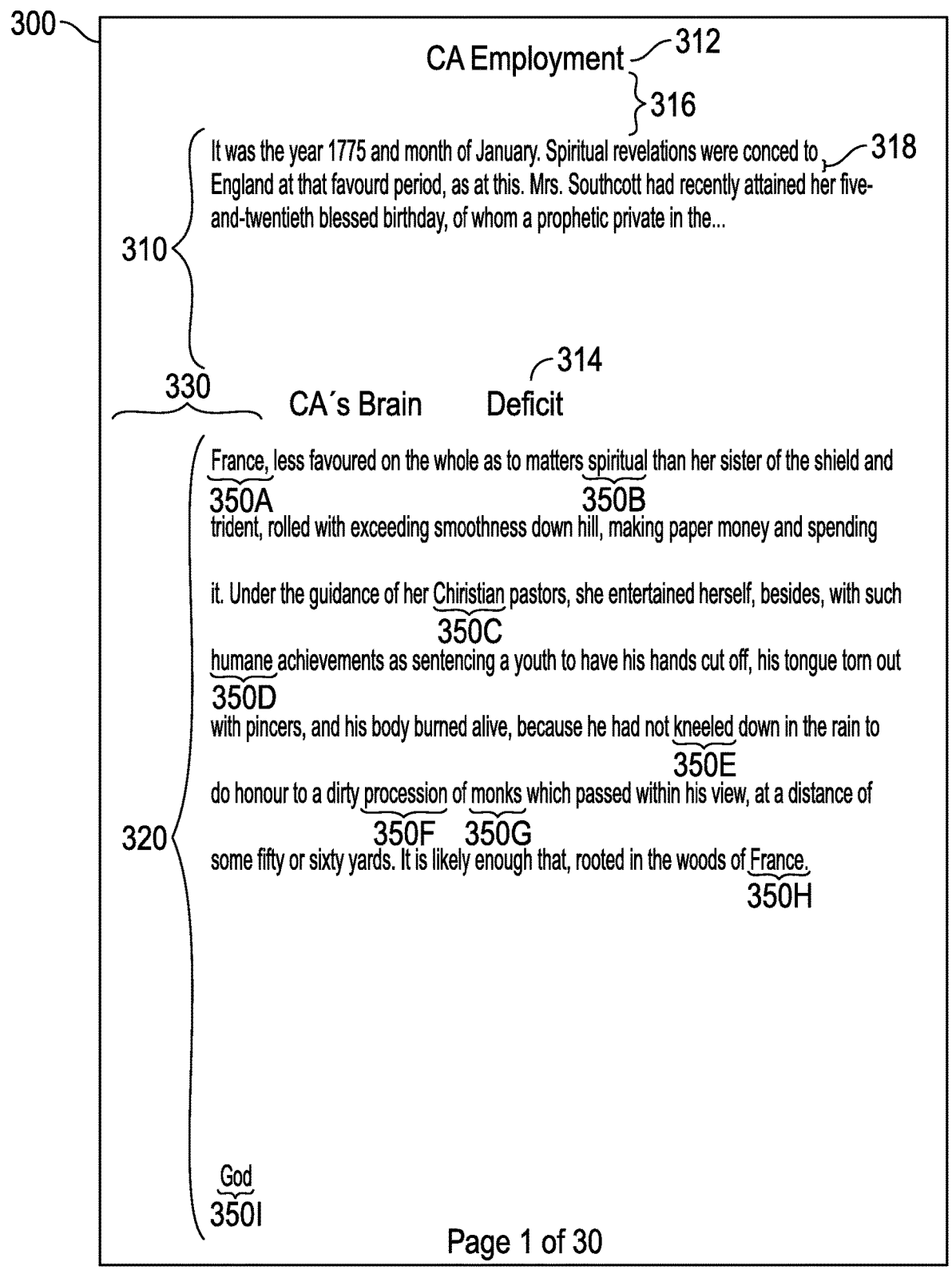
FIG. 3 illustrates an example document that may be processed by the concept indexing system, according to some embodiments of the present disclosure.

FIGS. 3 and 4 illustrate example documents that may be processed by the concept indexing system. As illustrated in FIG. 3, document 300 may include multiple segments 310 and 320. Referring to FIG. 4, document 400 may include subsegments 402, 410A-B, and/or 420. It will be appreciated that while segments are shown on one page of a document, a segment may extend and/or span multiple pages of a document. Methods and techniques for segmenting and/or identifying segments within documents is discussed in further detail herein.

System Overview

Figure 5:
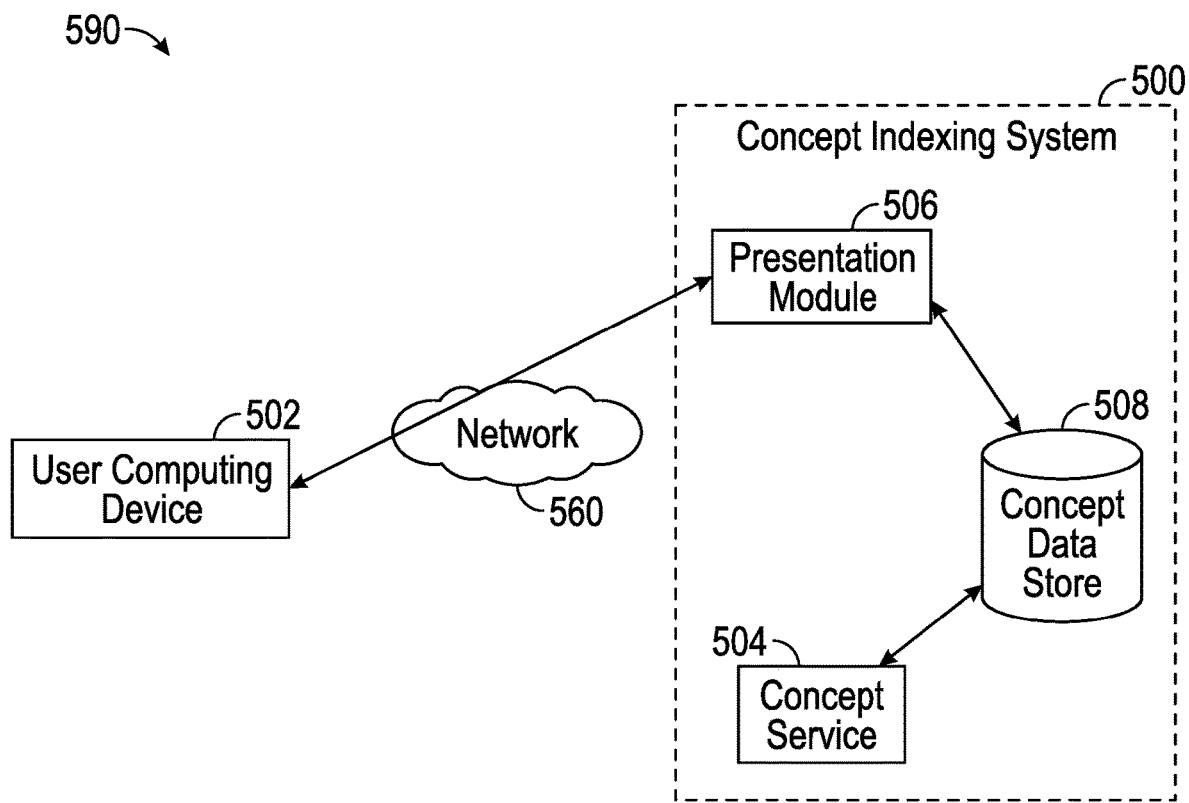
FIG. 5 is a block diagram illustrating an example concept indexing system, according to some embodiments of the present disclosure.

FIG. 5 illustrates a concept indexing system 500, according to some embodiments of the present disclosure. In the example embodiment of FIG. 5, the database environment 590 comprises a network 560, a concept indexing system 500, and a user computing device 502. Various communications between these devices are illustrated. For example, user computing device 502 may send requests and/or queries to concept indexing system 500. In this embodiment, concept indexing system 500 includes presentation module 506, concept service 504, and concept data store 508, each of which is described in further detail herein. The concept data store may store concept data in one or more databases, where "database" refers to a database (e.g., RDBMS or SQL database), an in-memory database, or may refer to any other data structure, such as, for example a hash map, hash set, JavaScript Object Notation (JSON), comma separated values (CSV), eXtendible markup language (XML), TeXT (TXT) file, flat file, spreadsheet file, and/or any other widely used or proprietary format.

In some embodiments, various communications and/or events within the database environment 590 may occur independently and/or in response to one another. For example, concept service and/or server 504 may process a collection and/or library of documents to index segment intersections of those documents by concept. The concept to segment indexes may be stored in the concept data store 508. User computing device 502 may be in communication with the presentation module 506. For example, presentation module may generate user interfaces, such as user interface 500 of FIGS. 1 and/or 2. In some embodiments, presentation module 506 may execute on a web and/or network server to present network pages and/or user interfaces to the user computing device 502. In response to queries originating from user computing device 502, presentation module 506 may query the indexes and/or data of concept data store 508. The results of the queries may be transmitted to user computing device 502 and/or presentation module 506.

Process Overview

Figure 6:
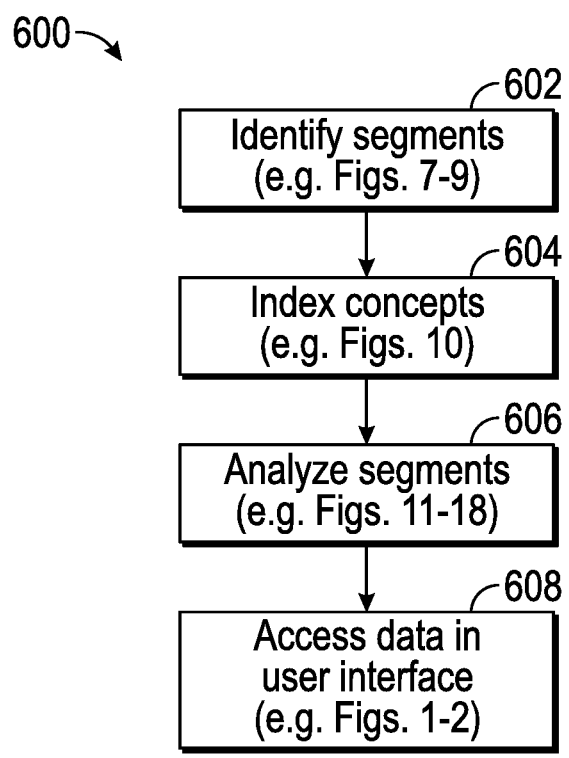
FIG. 6 is a flowchart illustrating an example concept indexing process overview, according to some embodiments of the present disclosure.

FIG. 6 is a flowchart illustrating an example concept indexing process overview 600, according to some embodiments of the present disclosure. The method of FIG. 6 may be performed by the concept indexing system 500 of FIG. 5, such as the various components of FIG. 5 that are discussed above, including concept service 504 and/or the presentation module 506. Depending on the embodiment, the method of FIG. 6 may include fewer or additional blocks and/or the blocks may be performed in order different than is illustrated.

Beginning at block 602, concept service 504 may identify segments intersections of one or more documents. Identifying segments of documents may include accessing the document, analyzing the features of the document, and/or merging related subsections of documents. In some embodiments, identifying segments of documents may be accomplished by machine learning algorithms and/or techniques, which will be described in further detail herein. Example processes and/or sub-processes of identifying segments are described in further detail with reference to FIGS. 7-9.

At block 604, concept service 504 indexes the segments identified at block 602 by concept. For example, concept service 504 may access a set of concepts and/or a concept hierarchy. In some embodiments, each individual concept from the set of concepts may be associated with an initial keyword set. Concept service 504 may then build an initial training set of segments that match words from the initial keyword set for each concept. The training set may be further developed by concept service 504 when other words not in the initial keyword set are identified from the identified segments matching the initial keyword set. As a result, concept service 504 may generate an index of concepts to segments. Similar to block 602, block 604 may be performed by concept service 504 using one or more machine learning algorithms and/or techniques. Furthermore, an example process of block 604 is described in further detail with reference to FIG. 10.

At block 606, concept service 504 further analyzes the segments to rank and/or score the segments. Ranking of a concept/segment combination may be based on the density and/or distribution of the concept within a segment. In other words, the ranking may be an "intrinsic" relationship of segment to a searchable concept. Furthermore, a researcher may be interested in two or more concepts. Typically, when a researcher is interested in and/or searches for two or more concepts and/or topics the researcher expects segments that relate equally to the two or more concepts. For example, if a researcher is researching employment in California, then the researcher may expect the article to be generally about both employment and California in equal amounts, as opposed to an article about employment that discusses employment in all fifty states. Thus, concept service 504 may be configured to generate statistical confidence weights and/or calculations indicating the segments that may be likely interest to the user when associated with two or more concepts. Example processes of concept ranking and/or intersection ranking are described in further detail with reference to FIGS. 11-15. In some embodiments, ranking of multiple searchable concepts may occur at query time (e.g., as described with reference to FIGS. 1 and/or 2) to combine segment weights for the multiple searchable concepts (e.g., as described with reference to FIG. 12).

Furthermore, segment analysis may constitute ranking of the segments based on one or more decay functions. In some cases, segments may be either temporal or more basic in nature. For example, a segment may be related to a particular month and/or time period, whereas a different segment may be more directed towards a fundamental principle and/or basic premise. An example of the former might be a historical account of a particular famine and an example of the latter may be an article regarding the common drivers or factors of macroeconomic growth. In some embodiments, concept service 504 may initially rank segments based on their publication dates and/or some other date (e.g., dates of publication of the article or document that includes the segment). Based on the number of temporal words in the segment, indicating that the segment is more temporal in nature, the recency ranking of the segment may be further adjusted. Other example processes and/or aspects of concept ranking, such as ranking based on recency decay, are described in further detail with reference to FIGS. 16-18.

At block 608, data, such as indices and/or segments, may be accessed by presentation module 506 for presentation in user interface 100. The access of concept and/or segment data by presentation module 506 for presentation in a user interface is described in further detail with reference to FIGS. 1, 2, 5, and/or 19.

Example Machine Learning Techniques

In some embodiments, segment identification, concept indexing, and/or other methods disclosed herein may be accomplished via one or more techniques and/or algorithms in artificial intelligence, machine learning, statistical and/or probabilistic machine learning, unsupervised learning, supervised learning, semi-supervised learning, and/or some combination thereof. For example, in supervised and/or semi-supervised learning contexts, a training set and/or training data may be used by concept service 504 to update respective machine learning algorithms. For example, a feature extractor may be used to extract features and/or attributes from each item of data. A user then categorizes the item of data and/or verifies the predicted categorization of the item of data, which is used by concept service 504 to update the machine learning algorithm based on the extracted features and the specified result. In some embodiments, the output of concept service 504 may be statistical likelihood of a predicted outcome based on the updated machine learning algorithm. Examples of machine learning algorithms that may be used with the systems and techniques described herein include decision trees and/or boosting. A decision tree may predict the value of a target variable based on several input variables and/or dimensions. Each interior node of a decision tree may correspond to one of the input variables. The edges of the decision tree may correspond to children for each of the possible values of that input variable. Each leaf may represent a value of the target variable given the values of the input variables represented by the path from the root to the leaf. A tree can be determined by splitting the source set into subsets based on an attribute value test. This process may be repeated by concept service 504 on each derived subset in a recursive manner, such as recursive partitioning. The recursion is completed when the subset at a node has all the same value of the target variable, or when splitting no longer adds value to the predictions. This process of top-down induction of decision trees may be an example greedy algorithm. As mentioned above, a machine learning algorithm may process a number of dimensions and/or features. However, the number of dimensions and/or features may become computationally intensive for processing purposes. Thus, a boosting algorithm may select those features which improve the predictive power and/or accuracy of the machine learning algorithm model, which may reduce the number of dimensions and/or features that may improve execution time as irrelevant features and/or dimensions are ignored. A boosting algorithm may be a method of training a boosted classifier. A boosting classifier may include a classifier in the form of:

$$F_T(x) = \sum_{t=1}^{T} f_t(x)$$

Where each $f_t$ is a weak learner that takes an object and/or data x as input and returns a result indicating the classification of the object and/or data. The sign of the weak learner output may identify y the predicted object and/or data class and the absolute value gives the statistical confidence in that classification. At each iteration of the training process, a weight may be assigned to each sample in the training set equal to the current error of that sample. These weights may be used to inform the training of the weak learner, for instance, decision trees can be grown that favor splitting sets of samples with high weights. Thus, decisions trees and/or boosting are non-limiting examples of machine learning algorithms that may be used by the concept indexing systems.

In some embodiments, concept indexing and/or segment analysis and/or ranking using the techniques described herein may be based on other metadata associated with a segment, such as author, publisher, research institution, etc. For example, the concept indexing system may extract author, publishers, and/or publication dates for segments and/or documents for additional processing. For example, a machine learning algorithm may be used to determine concepts that an author typically writes and/or publishes on. In some embodiments, the concept indexing system may support post-indexing filters that allow users to filter by author, publication date, publisher, etc. For example, filters that may be available in user interface 100.

Identifying Segments

Figure 7:
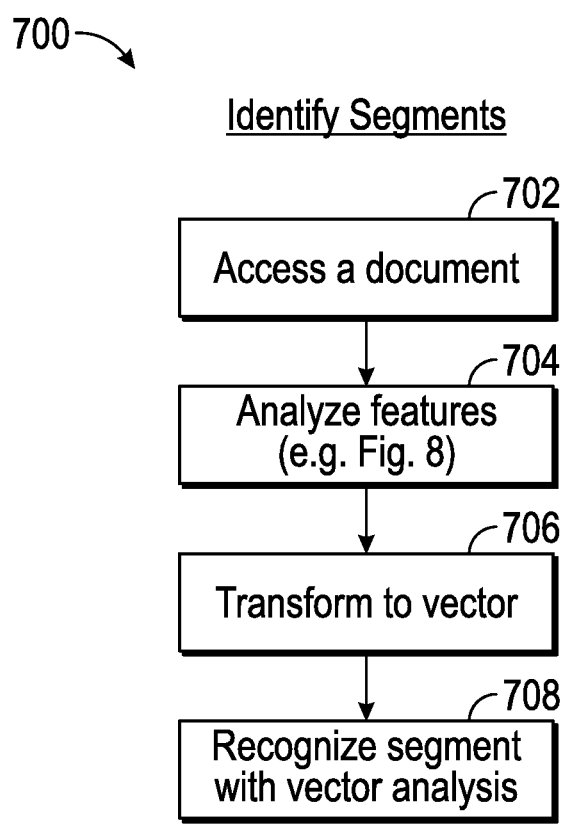
FIG. 7 is a flowchart illustrating an example segment identification process, according to some embodiments of the present disclosure.

FIG. 7 is a flowchart illustrating an example segment identification process 700, such as may be performed as part of the segment identification process 602 of FIG. 6, according to some embodiments of the present disclosure. The method of FIG. 7 may be performed by the concept indexing system 500 of FIG. 5, such as the various components of FIG. 5 that are discussed above, including concept service 504. Depending on the embodiment, the method of FIG. 7 may include fewer or additional blocks and/or the blocks may be performed in order different than is illustrated.

Beginning at block 702, concept service 504 accesses a document. As described herein, a document may include one or more segments. Example documents may include document 300 and/or document 400 of FIGS. 3 and/or 4, respectively. In some embodiments, documents may be stored in the concept data store 508 in various data formats. For example, text data associated with distinct documents may be stored in concept data store 508. Additionally or alternatively, native formats of documents may be stored in the constant data store 508 such as a PDF, a word processing document format, an image data format, or some other data format. Concept service 504 may process any native document formats to generate associated text data using one or more optical character recognition techniques.

At block 704, concept service 504 analyzes various features of the accessed document. For example, casing, spacing, punctuation, formatting, comment words and/or groups of words, and/or other features of the document may indicate segments. In some cases, documents have a formatting structure to organize the document. For example, portions and/or segments of the document may be segregated by headings, such as titles and/or subtitles. The headings may include specific casing formats, such as capitalizing of the first letter of words or capitalizing all letters of all words, and/or particular sizing and/or fonts of the headings. For example, headings may be larger in size and/or in a bold font. Punctuation may also indicate beginnings of new segments. For example, titles typically may not include period characters, however, a title and/or subtitle may include a question mark or semi-colon character. Various word processing techniques may be used to analyze the features of the text data and/or document. Examples of segment feature identification of a document is further described in detail with reference to FIG. 8.

At block 706, concept service 504 generates a vector and/or data structure based on the identified features from block 704. For example, a binary vector such as "[100110101010 ... ]" may be generated from the identified features. In the previous vector example, at the first position of the vector a "1" may indicate that a portion of the document starts with capital letter and at the second position of the vector a "0" may indicate that the same portion of text does not end with a question mark or semi-colon character. The vector and/or data structure may be used by concept service 504 to generate a statistical likelihood indicating whether a segment is present, which is described below.

At block 708, concept service 504 processes the vector and/or data structure generated at block 706 to compute a statistical likelihood whether the one or more portions of the document correspond to one or more segments. For example, concept service 504 may use a machine learning algorithm to process the vector data. Concept service 504 may determine the segments based on the location of the titles and/or headings within the document. For example, as illustrated in document 300 of FIG. 3, segment 310 is between heading 312 and heading 314 and segment 320 is between heading 314 and another heading (not illustrated) or the end of the document. As described herein, concept service may use a decision tree, boosting algorithm, and/or some other machine learning algorithm to process the vector data and generate a statistical likelihood that a portion of a document is a segment. In some embodiments, the statistical likelihoods and/or indicators of segment identification may be stored in concept data store 508. In some embodiments, blocks 702, 704, 706, and/or 708 may execute iteratively to process a collection of documents. Additionally or alternatively, concept service 504 may iteratively execute some blocks of process 700 to process portions of a document to identify segments in an iterative manner. For example, process 700 may identify a first, second, and third segment of a document by iterative executions of some blocks of process 700.

In some embodiments, an optional step and/or block of process 700 may be training of the concept indexing system and/or machine learning algorithm. For example, as described above, a machine learning algorithm for providing statistical confidence levels for segment predictions may be based on a training set. Through supervised and/or semi-supervised machine learning, an operator may specify whether headings and/or segments of documents have been accurately identified. Thus, the machine learning algorithm for identifying segments may be trained as an optional step of process 700.

Figure 8:
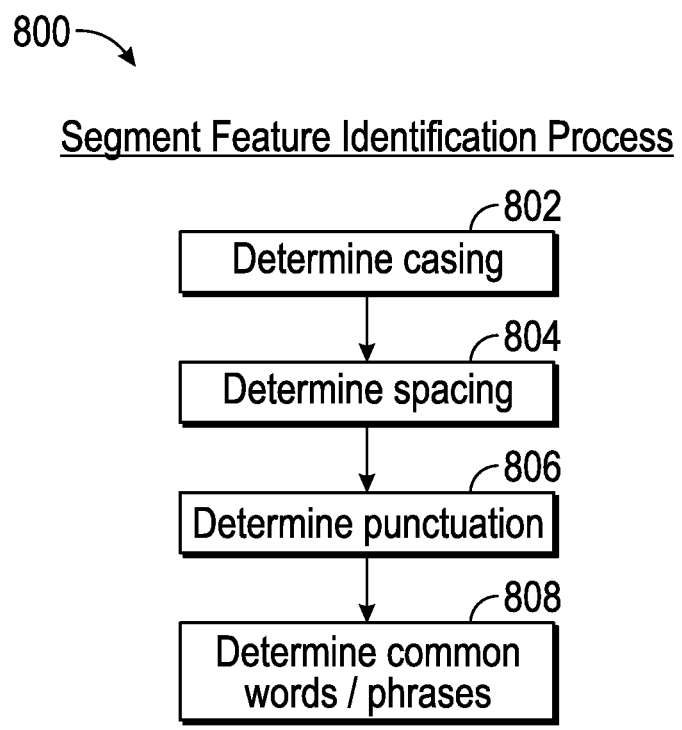
FIG. 8 is a flowchart illustrating an example segment feature identification process, according to some embodiments of the present disclosure.

FIG. 8 is a flowchart illustrating an example segment feature identification process 800, such as may be performed as part of the feature analysis process and/or block 704 of FIG. 7, according to some embodiments of the present disclosure. The method of FIG. 8 may be performed by the concept indexing system 500 of FIG. 5, such as the various components of FIG. 5 that are discussed above, including concept service 504. Depending on the embodiment, the method of FIG. 8 may include fewer or additional blocks and/or the blocks may be performed in order different than is illustrated. For example, other segment and/or heading features may be used to determine segments and/or headings additionally or alternatively to the features described below.

Beginning at block 802, concept service 504 may determine and/or analyze casing features of a document. As described herein, casing may refer to the capitalization of particular letters and text data to indicate whether the text is possibly associated with a heading and/or title. For example, text 312 of FIG. 3, "CA Employment," includes capitalization of letters that may be identified by concept service 504. Another casing feature includes capitalization of all of the letters text, such as, "CALIFORNIA EMPLOYMENT WEEKLY." In some embodiments, it will be appreciated that other font and/or letter sizing techniques may be used to recognize headings and/or titles. Depending on the embodiment, such casing determinations within a document may be compared to other portions of the document order to identify probable segment headings. For example, if a document includes four lines of text in all caps, separated by multiple paragraphs using sentence case, the concept service 504 may determine based on such casing information that the four lines of capitalized text could be segment headings.

At block 804, concept service 504 may determine and/or analyze spacing features of a document to determine headings and/or segments. For example, as illustrated in FIG. 3, document 300 includes line spacing 316 and line spacing 318. In this example, line spacing 316 is larger than the line spacing 318. For example, the line spacing between a heading may be two lines, whereas the line spacing between paragraph text may be single spaced and/or different than the heading line spacing. Thus, the concept service 504 may use the increased spacing 316 as another attribute indicative of a possible segment heading.

Other document and/or segment features that may be analyzed include the centering of headings. For example, the centered spacing of heading 314 might be determined by concept service analyzing the white space and/or indentation 330 and/or some other text and/or document features of document 300. Thus, identification of centered text, especially when text below and/or above the centered text is not centered (e.g. paragraph text that is left aligned or justified), provides concept service 504 another attribute usable to identify possible segment headings.

At block 806, concept service 504 may determine and/or analyze punctuation features of a document to determine headings and/or segments. For example, as described herein, unlike text of a paragraph, the text of the heading may not end in a period character. However, a heading may end in one or more specific punctuation and/or special characters, such as a question mark or a semi-colon character. Thus, concept service 504 may analyze various punctuation and/or character features that are factors that contribute to a statistical likelihood of the presence of headings and/or segments of a document.

At block 808, concept service 504 may determine and/or analyze common words, phrases, and/or groups of words to determine headings and/or segments of the document. Some documents may begin with introductory phrases and/or words for headings. Example introductory words and/or phrases include, "Situation in," "Update on," "Summary," "Conclusion," or some other word and/or groups of words that are typically used in document headings. In some embodiments, introductory phrases and/or words may be user generated, determined by machine learning, and/or some combination thereof, such as determining introductory words based on a training set. Thus, concept service 504 may analyze common words and/or groups of words to generate a statistical likelihood for the presence of headings and/or segments.

In some embodiments, it will be appreciated that some combination of blocks 802-808 may be executed to determine a statistical likelihood regarding the presence of a heading and/or segment in a document. For example, some combination of blocks 802-808 may be executed by process 700 of FIG. 7, such as block 704 to analyze one or more features and/or attributes of a document. Thus, concept service 504 may use some combination of document features, such as, casing, spacing, punctuation, formatting, common words, grouping of words, and/or phrases to generate a likelihood that various portions of documents are segments. For example, the various features are transformed to one or more vectors at block 706 of FIG. 7 and may be processed by a machine learning algorithm at block 708 to generate a statistical likelihood of the presence of headings and/or segments in a document.

Figure 9:
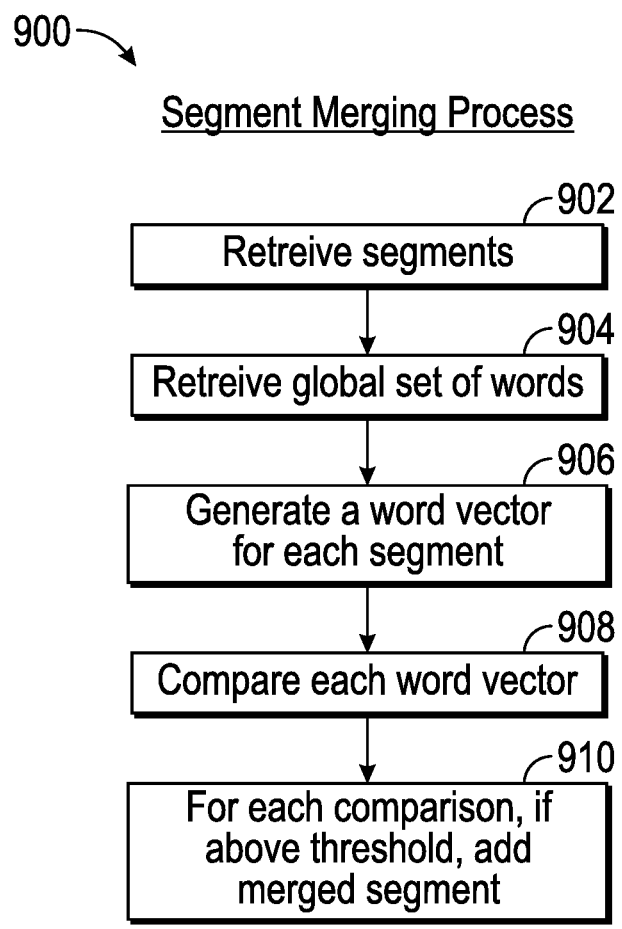
FIG. 9 is a flowchart illustrating an example segment merging process, according to some embodiments of the present disclosure.

FIG. 9 is a flowchart illustrating an example segment merging process 900, according to some embodiments of the present disclosure. In some cases, the segmentation processes 700 and/or 800 may be overly aggressive and/or incorrectly identify too granular of sections. For example, as illustrated in FIG. 4, document 400 may include subsections 410A and 410B. In the example, concept service 504 may initially identify each subsection 410A and 410B as two discrete segments. Thus, concept service 504 implementing process 900 may determine that subsections 410A-B should be merged together into one segment. In other words, process 900 may merge back sections and/or segments that were too aggressively split (e.g. minor sections and/or segments that belong together) using the vector similarity of the separated sections and/or segments, for example. The method of FIG. 9 may be performed by the concept indexing system 500 of FIG. 5, such as the various components of FIG. 5 that are discussed above, including concept service 504. Depending on the embodiment, the method of FIG. 9 may include fewer or additional blocks and/or the blocks may be performed in order different than is illustrated.

Beginning at block 902, concept service 504 retrieves and/or accesses segments from concept data store 508. Concept service 504 may access two or more segments to determine whether the segments should be merged. For example, concept service 504 may access and retrieve every segment, a particular set of segments, the segments for a particular document, and/or some combination thereof from concept data store 508. In one embodiment, the segments analyzed for possible merging include only segments that are adjacent one another within a single document.

At block 904, concept service 504 retrieves and/or accesses a global set of words from concept data store 508. For example, a global set of words may comprise a collection and/or data structure of each word from the library or a collection of documents. A global set of words may be determined based on one or more processes described herein, such as process 600 that may process every document in the library and/or collection, which may include the scanning of every document. For example, a global set of words may include a vector and/or data structures such as "['a,' 'about,' 'achievements,' 'adjacent,' 'after' alive,' 'already,' 'America,' 'and,' 'announcing,' . . . ]." In some embodiments, a global set of words may correspond to generally common words, such as a set of common words available from a third-party library.

At block 906, concept service 504 may generate a word vector for the segments retrieved at block 902. For example, the global set of words, accessed at block 904, may be used to generate a word vector indicating the presence and/or count of words in the text of the segment. Using the example global word vector from above, Segment A may correspond to word Vector A: "[10, 2, 1, 0, 0, 0, 0, 0, 2, 2, 0, . . . ]" and Segment B may correspond to word Vector B: "[9, 1, 0, 0, 0, 0, 0, 0, 4, 2, 0, . . . ]." Thus, word vectors A and B may indicate the number of times a word from the global word vector is present in the text corresponding to segments A and B, respectively.

At block 908, concept service 504 compares the word vectors from block 906. For example, one comparison method that may be used by concept service 504 to determine the similarity of segments may be to use a cosine distance formula and/or a cosine similarity. Cosine distance and/or similarity may be a measure of similarity between two vectors of an inner product space that may measure the cosine of the angle between them. The cosine of 0° is 1, and it is less than 1 for any other angle. This may be determination of orientation: two vectors with the same orientation may have a cosine similarity of 1, two vectors at 90° may have a similarity of 0, and/or two vectors diametrically opposed may have a similarity of −1, independent of their magnitude. Cosine distance and/or similarity may be used in positive space, where the outcome is neatly bounded in [0, 1]. Cosine of two vectors may be determined by using the Euclidean dot product formula:

$$A \cdot B = \|A\| \|B\| \cos \theta$$

Thus, in the example with vectors A and B, the cosine of the angle between them may be about 0.922, which may indicate similarity between the two segments A and B. For example, segments A and B may both be about the topic of "America" and/or include a similar number of the occurrences of the word "America." It will be appreciated that process 900 may use other methods for calculating the similarity between two word vectors and/or may use another process for determining similarity between segments without the use of vectors.

At block 910, concept service 504 determines which segments to merge based on the comparison between the two or more segments. For example, for each comparison, if the comparison is above a threshold, concept service 504 may determine that two or more segments should be merged. For example, a cosine similarity between two word vectors above 0.8 may indicate that those segments should be merged.

In some embodiments, concept service 504 may optionally store and/or index the pre- and post-merged segments. For example, where segments A and B are merged by concept service 504 into segment AB, concept service 504 may store and/or index segments A, B, and/or AB (individually) in concept data store 508. In some embodiments, it may be advantageous to store the various pre- and post-merged segments individually for improved recall.

In some embodiments, process 900 may be used by concept service 504 to merge segments from more than one document. For example, where an original document is separated into two volumes and/or parts, such as a part one and part two, concept service 504 may use the process 900 to identify segments meeting the threshold similarity measure and merge those segments from multiple documents, such as two separate PDF documents. It will also be appreciated that, in some embodiments concept service 504 may iteratively apply the blocks of process 900 to iteratively merge segments. For example, concept service 504 may merge segments A and B into a new segment AB, and concept service may further merge segment AB and segment C into a new segment ABC using the merging process 900.

Concept Indexing

Figure 10:
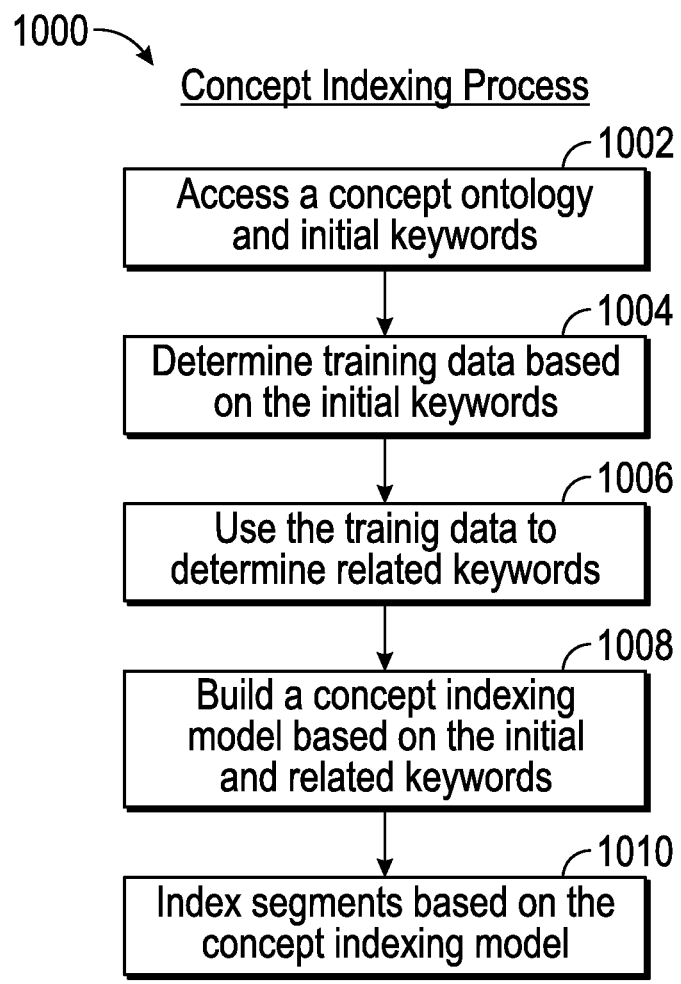
FIG. 10 is a flowchart illustrating an example concept indexing process, according to some embodiments of the present disclosure.

FIG. 10 is a flowchart illustrating an example concept indexing process 1000, such as may be performed as part of the concept indexing block 604 of FIG. 6, according to some embodiments of the present disclosure. In some embodiments, additionally or alternatively to keyword searching, it may be advantageous for research organizations and/or researchers to maintain a higher level ontology, concept hierarchy and/or high-level categories associated with their research articles, documents, and/or segments. For example, a researcher may use the concept ontology and/or hierarchy to query and/or navigate the document and/or segment library/database as described herein. In some embodiments, an index and/or mapping from higher-level concepts to individual segments may be determined based on initial keywords and/or grounded weights, as described below. The method of FIG. 10 may be performed by the concept indexing system 500 of FIG. 5, such as the various components of FIG. 5 that are discussed above, including concept service 504. Depending on the embodiment, the method of FIG. 10 may include fewer or additional blocks and/or the blocks may be performed in order different than is illustrated.

Beginning at block 1002, concept service 504 accesses a concept ontology and/or hierarchy that is associated with initial keywords. In some embodiments, an initial keyword mapping from particular words to the concept may be used to create a "dictionary" of a concept based on a set of related words, which is described in further detail below. For example, a concept, "Agricultural Equipment," may be associated with the keywords, "tractor," "plow," "rotator," "roller," "seed drill," etc. In some embodiments, the concept ontology, concept hierarchy, and/or mapping of concepts to initial keywords, may be user generated and/or provided by a user and/or research manager.

At block 1004, concept service 504 determines training data based on the initial keywords and/or keyword mapping. For example, concept service 504 may identify segments that include words from the one or more initial keyword sets. In the agricultural equipment example, the initial training data may include those segments that include text data and/or keywords such as "tractor," "plow," "rotator," "roller," "seed drill," etc. Thus, concept service 504 determines an initial training set of segments and/or data that may be used by the machine learning algorithm to determine segments associated with the concept.

At block 1006, concept service 504 uses the training data to determine related keywords and/or related keyword mappings. For example, concept service 504, using one or more machine learning techniques, may identify related keywords and/or mappings from the initial keywords. An example of related keyword identification through machine learning may be determining the words most uniquely correlated with the ones used in the initial keyword to concept mapping. For example, through applying the machine learning algorithm, concept service 504 may determine related keywords such as "fertilizer spreader," "broadcast seeder," or other related words to the concept of agricultural equipment, but which were not originally specified in the initial keywords set. In other words, the initially identified segments associated with the initial keywords may be used as positive examples of concept terminology by the machine learning algorithm.

At block 1008, concept service 504 may create a concept indexing model and/or machine learning algorithm based on the initial keywords set and the determined related keywords. For example, concept service 504 may include a superset of keywords that includes the initial keyword and the determined related keyword set for the respective concept. Therefore, concept service 504 may be configured to determine segments associated with a concept based on the concept indexing model. Furthermore, the concept indexing model that includes the related keywords may identify segments that were not originally identified based on the initial keywords set. In some embodiments, the concept indexing model and/or algorithm may output a statistical likelihood, probability of correctness, and/or confidence level that a segment may be associated with a respective concept. In some embodiments, the statistical likelihoods of concept to segment associations may be presented to the user, such as by the presentation module 506 in user interface 100. In some embodiments, blocks 1006 and 1008 may be repeated iteratively as additional segments are associated with concepts, such as to identify additional related keywords to correlate with particular concepts and then rebuilding or updating the model for that concept to potentially identify other related segments that may not have been identified using the previous version of the model. In this way, the concept identification process improves over time as additional segments are associated with particular concepts.

At block 1010, concept service may index segments based on the determined concept indexing model. For example, the segments identified by processes 700 and/or 900, which are stored in the concept data store 508, may be processed by concept service 504 to generate an index and/or mapping from individual concepts to correlating segments within the document library. In some embodiments, a concept to segment index may be stored in the concept data store 508 in various data formats. For example, concept to segment index may include a database index, a hash map, a hash set, an in-memory data object, some combination thereof, and/or any other data and/or data structure that can store a mapping from a concept to a segment. Additionally or alternatively, concept service 504 may store a concept to segment index for the concept to segment mappings that are above a statistical threshold and/or percentage as determined by the concept indexing model and/or algorithm. In some embodiments, the concept to segment index may store the statistical likelihood of concept to segment mappings as determined by the concept indexing algorithm. Thus, concept to segment index may include a list of concepts and, for each of the concepts, identifiers of zero or more segments that have a threshold likelihood of relating to that particular concept, where in some embodiments certain segments are not included in the listing if their corresponding likelihoods are below a predetermined threshold. The likelihood indicators are usable, as discussed herein, to sort and/or filter display of segments matching a particular concept (or concept) to provide the optimal quantity and relevance of results to a given user.

In some embodiments, concept service 504 may iteratively improve the accuracy of the concept indexing model and/or algorithm based on user feedback. For example, a user may interact with the concept indexing system to specify whether the concept to segment determination was accurate. For example, the weights of keyword vectors to concepts and/or weightings of particular words to a concept may be reviewed by a user for accuracy. Thus, concept service 504 may use supervised and/or semi-supervised techniques to improve the accuracy of the concept indexing model and/or algorithm.

Segment Analysis and/or Ranking

In some embodiments, the concept to segment indexes may be further analyzed and/or processed to enhance the user querying experience. For example, segments that are associated with a concept may be further ranked and/or ordered to provide the most likely segments and/or relevant items of interest to the user. The processes discussed below with reference to FIGS. 11-18 may be performed as part of the segment analysis process 606 of FIG. 6. Additionally, in certain embodiments one or more of the processes of FIGS. 11-18 may be used as part of the concept indexing process 604 of FIG. 6. For example, density of keywords in a segment, concept intersection information, and/or segment recency information may be used to associate concepts with segments. In some embodiments, these processes may be used to adjust particular concept to segment relevancy scores in order to better indicate relevance of a particular segment to a given concept that may have been originally determined without such additional analyses.

Figure 11:
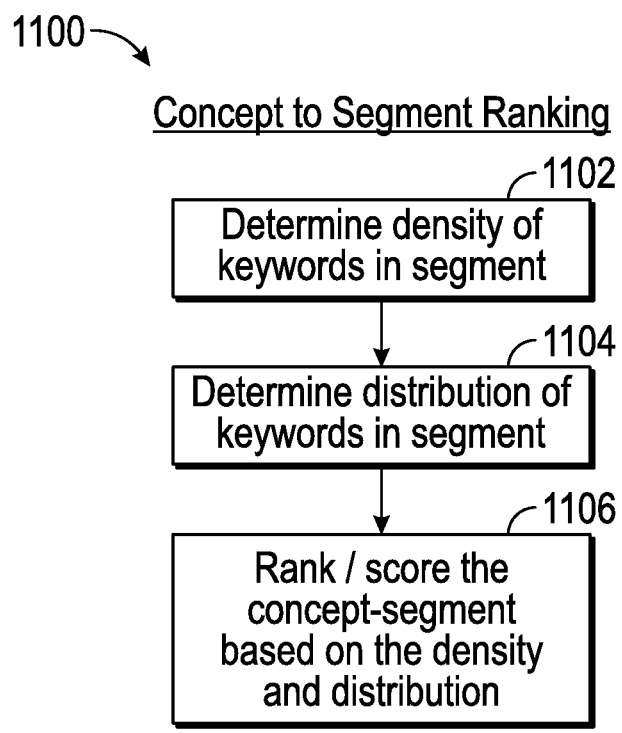
FIG. 11 is a flowchart illustrating an example concept to segment ranking process, according to some embodiments of the present disclosure.

FIG. 11 is a flowchart illustrating an example concept to segment ranking process 1100, according to some embodiments of the present disclosure. In certain embodiments, it may be useful and/or advantageous to display the segments that are most related to the concept user. In some embodiments, the "aboutness" and/or relevance of a concept to a segment may be determined based on the density of concept keywords in a segment. In some embodiments, the concept indexing system may use the respective term and/or relevant keyword distribution within a segment to gauge the "aboutness" of the segment with respect to a particular concept. For example, a segment about tractors might have a dense subparagraph about Idaho, while another document may reference Idaho even throughout the segment may be more "about" Idaho. In some embodiments, the "aboutness" of a segment may be measured by looking at a ratio of the median gap between consecutive mentions of the term in question (e.g. Idaho) divided by the longest span in the document without any mention of the term. Larger ratios may be more indicative of a more even distribution of the term throughout the document, or more "aboutness." Other methods for determining the "aboutness" of a concept to a segment include breaking the segment into portions and determining the number of times the relevant one or more terms appear in the portions. For example, a segment may be separated into portions of ten words and the segment may be analyzed for the number of times a particular terms are present within the portions and/or the number of portions with the particular terms. The method of FIG. 11 may be performed by the concept indexing system 500 of FIG. 5, such as the various components of FIG. 5 that are discussed above, including concept service 504 and/or presentation module 506. Depending on the embodiment, the method of FIG. 11 may include fewer or additional blocks and/or the blocks may be performed in order different than is illustrated.

Beginning at block 1102, concept service 504 may determine the density of keywords associated with the concept in a segment. In some embodiments, the density of relevant keywords may refer and/or be calculated with the following equation:

$$\frac{\text{\# of relevant keywords}}{\text{segment length}}$$

In addition to its plain and ordinary, segment length may refer to the number of words in a segment and/or the number of characters in a segment, for example. An example density of a segment Y with 100 keywords associated with agricultural equipment and a word count of 1000 may have a density of 0.1. If segment Z had a density of 0.05, then concept service 504 and/or presentation module 506 may determine a ranking that segment Y is more "about" the concept of agricultural equipment than segment Z. Determining the density of keywords may be advantageous as compared to other information retrieval techniques. For example, an information retrieval system based on keyword searching would return results that have at least one occurrence of a keyword, which effectively normalizes the results with respect to the density of the keywords.

At block 1104, concept service 504 may determine the distribution of keywords in a segment. For example, concept service 504 may use how the occurrences are distributed within a segment to rank and/or score the relevance and/or aboutness of a concept relative to a segment. As illustrated in FIG. 3, the relevant keywords 350A-I of segment 320 may be associated with the concept of religion. As illustrated in FIG. 4, the relevant keywords 450A-I of segment 420 may also be associated with the concept of religion. (It will be appreciated that the text of documents 300 and 400 may not be associated with the document headings simply for example purposes.) Furthermore, the number of relevant keywords 350A-I and keywords 450A-I (e.g., keywords associated with one or more concepts provided by a user) may be the same, such as nine keywords. However, the distribution of keywords 350A-I and 450A-I may be different. For example, the distance and/or gaps between keywords in segment 320 may be smaller than the distance and/or gaps between keywords in segment 420. In other words, segment 320 may have a higher concentration of related keywords, which may indicate that the segment is less about the concept religion than the segment 420 where the relevant keywords are more dispersed throughout the segment. Segment 420 may be considered more "pure" because it generally discusses the concept throughout the segment.

Another example of a segment that has a high density of keywords may be a segment that generally is about Ohio but which has a portion of the segment that specifically discusses agricultural equipment. Thus, concept service would determine the distribution of keywords to indicate that the segment is generally more about Ohio with a small focus on agricultural equipment.

Concept service 504 may use one or more formulas to calculate and/or determine the distribution of keywords in a segment. For example, concept service may use one or more metrics to determine the distribution of keywords. An example metric is the median gaps between keywords. In addition to its plain and ordinary meaning, a gap may refer to the number of words and/or characters between two words. For example, the median gap between the keywords of segment 320 may be relatively small because the keywords are located relatively close together in contrast with the relatively large median gap of keywords of segment 420. Another metric that may be used is maximum gap, which may refer to the greatest distance between keywords. For example, in segment 320 the maximum gap would be the number of words and/or characters between the keyword 350H, "France," and the keyword 350I, "God," at the bottom of the segment. An example ratio, and/or formula that may be further used by concept service 504 to determine distributions of keywords is:

$$\frac{\text{Maximum Gap}}{\text{Median Gap}}$$

Thus, the maximum/median gap ratio would be higher for segment 320 than for segment 420, which may indicate that segment 320 is relatively less about the concept than segment 420. In some embodiments, the maximum/median gap ratio may be used by multiplying the ratio times the density of the concept in the segment to determine the weight of the concept in the segment.

At block 1106, concept service 504 and/or presentation module 506 ranks and/or scores concept to segment mappings based on the density and/or distribution of related keywords. For example, segments with higher density related keywords and/or segments with greater distributions of related keywords may be more about the concept. In some embodiments, rankings of concepts to segments may be pre-computed and/or cached by concept service 504 for later access and/or retrieval. Additionally or alternatively, ranking and/or scoring of concepts to segments may be determined in real-time or near-time based on queries from an end user in user interface 100. For example, presentation module 506 may dynamically calculate rankings and/or scoring, such as rankings and/or scoring that reflect the "aboutness" of a concept to a segment based on blocks 1102 and/or 1104 in response to a user query. For example, as illustrated in FIG. 1, presentation module 506 may present the rankings of segments and/or present segment search results to a user in an order based on the determined ranking.

Figure 12:
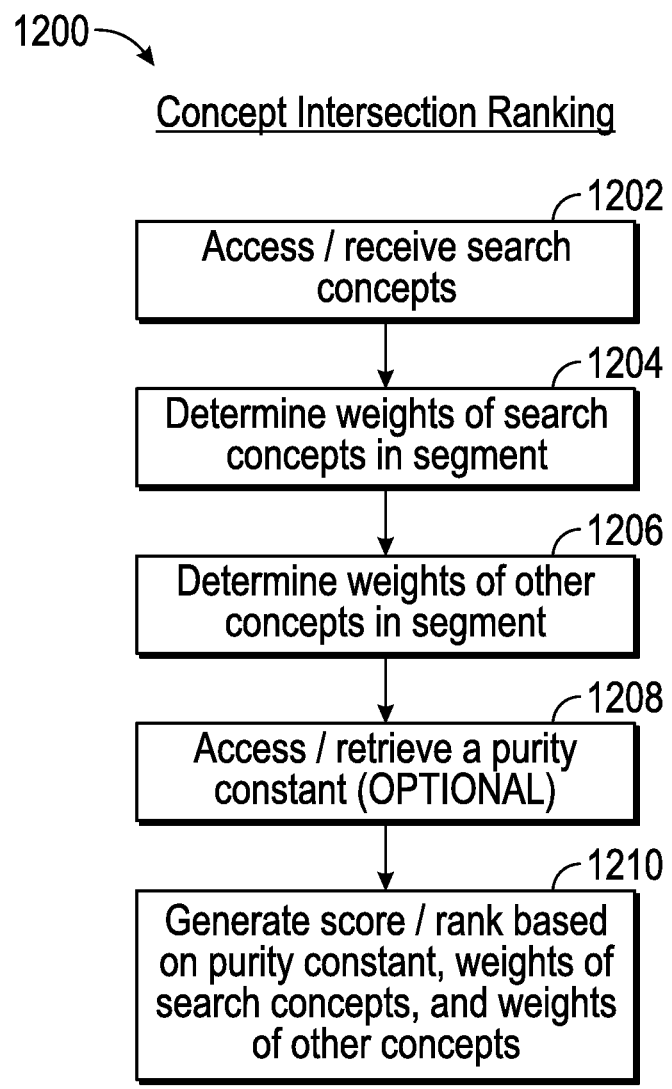
FIG. 12 is a flowchart illustrating an example concept intersection ranking process, according to some embodiments of the present disclosure.

FIG. 12 is a flowchart illustrating an example concept intersection ranking process 1200, according to some embodiments of the present disclosure. For example, as illustrated in user interface 100 of FIG. 1, two or more concepts may be selected in a search query. Thus, the concept indexing system may determine rankings for the segments as they are applicable to the combination of the two or more concepts. In some embodiments, in a concept driven search system, such as the concept indexing system, where a user selects two or more concepts for a search of the segment database, a user may be interested in segments that discuss the concepts in equal weight. In other words, when users search for multiple concepts, such as two concepts, users may be more interested in concepts that are about both concepts than unequally discussing one topic over another. For example, a segment that has one occurrence of the concept "Idaho" and seven of the concept "Agriculture" may be a less desired result than another segment that has four occurrences of "Idaho" and four occurrences of "Agriculture," which is a more balanced segment, and, therefore, may be of greater interest to the user. Additionally, a four paragraph segment that includes a first two paragraphs having twenty occurrences of keywords associate with the concept "Idaho" and only two occurrences of keywords associated with the concept "Agriculture," while the last two paragraphs having only two occurrences of keywords associated with the concept "Idaho" and 20 occurrences of keywords associated with the concept "Agriculture," may not be of primary interest to a user that is looking for segments that relate to both concepts "Idaho" and Agriculture" in view of the largely segmented discussion of keywords associated with those concepts (and even though the keywords occurrences for each concept are equal across the entire segment).

One method of determining intersection of concepts and/or weighting scheme is using a geometric mean function. For example, a concept to segment ranking may be determined by a geometric mean of positive concepts (keywords and/or terms from a segment matching the query), which may be subtracted by negative concepts (keywords and/or terms from a segment not matching the query), which is described in further detail below. Another aspect of concept ranking is that a segment is more "pure" when there are less or zero concepts in the segment that are not one of the one or more specified search concepts.

The method of FIG. 12 may be performed by the concept indexing system 500 of FIG. 5, such as the various components of FIG. 5 that are discussed above, including concept service 504 and/or presentation module 506. Depending on the embodiment, the method of FIG. 12 may include fewer or additional blocks and/or the blocks may be performed in order different than is illustrated.

Beginning at block 1202, presentation module 506 accesses and/or receives the specified search concepts. For example, presentation module 506 may receive a search query for the two concepts of California and technology. In the example, presentation module 506 processes the segments that relate to both concepts, as described below.

At block 1204, presentation module 506 determines the respective weights of search concepts in the one or more segments. For example, positive concepts may include concepts and/or segments that match the search query. As described herein, concepts matching a segment and/or the weights of the search concepts may be based on one or more related keywords, the density of keywords, the distribution of keywords, the aboutness of a concept in a segment, the distribution ratio, and/or based on other methods.

Presentation module 506 may determine respective weights of search concepts based on methods related to term frequency. One such method that may be used is term frequency-inverse document frequency ("TF-IDF"). Generally, TF-IDF is a numerical statistic and/or weighting scheme that reflects how important terms are in a collection. Term frequency ("TF") may refer to the number of times that terms and/or keywords associated with a particular search concept occurs in a segment. Inverse document frequency ("IDF") may refer to a measure of how common or rare the terms and/or keywords are across the library of segments. One example inverse document frequency formula that may be used is:

$$IDF = \log\left(\frac{\text{total number of segments}}{\text{number of segments with the terms}}\right)$$

One example calculation to determine TF-IDF weights is to multiply the TF by IDF. In some embodiments, TF-IDF may be used by the concept indexing system for ranking and/or searching of titles and/or headers. However, in some embodiments, where TF-IDF is used, if two search concepts appear in all or the same number of segments then the two search concepts will be treated the same by the inverse document frequency weighting scheme. For example, if "US" and "Microprocessor" appear in all of the segments, but "US" occurs ten times and "Microprocessor" only occurs five times, then TF-IDF may assign the same weight to both search concepts even though the "Microprocessor" search concept is rarer and/or likely the most important search concept. In some embodiments, a concept weighting scheme and/or process may be used instead of TF-IDF that can differentiate between search concepts that show up in the same number of segments but a different number of times. A concept weighting process may be based on term frequency and metadata and/or histogram data associated with respective search concepts. Methods and techniques for concept weighting are described in further detail with respect to FIGS. 13 and 14.

At block 1206, presentation module 506 determines the respective weights of other concepts in the one or more segments. In some embodiments, determining weights of the other concepts in the one or more segments may be similar to block 1204. For example, the weights of the other concepts may be based on the sum of the weights of the individual "other" concepts. For example, similar to the weights of positive concepts, the weights of other concepts may be based on the one or more other keywords, the density of keywords, the distribution of keywords, the "aboutness" of a concept in a segment, the distribution ratio, and/or based on other methods.

At block 1208, presentation module 506 may optionally access and/or retrieve a purity constant. For example, the purity constant may be referred to as $\partial$ below. In some embodiments, the purity constant may be used by the concept indexing system to determine the ratio and/or pureness of search concepts in a segment, which is described in greater detail below. The purity constant and/or $\partial$ may indicate the balance between the search concepts and other concepts in determining the concept intersection ranking. In other words, $\partial$ may indicate how much a user cares about pureness of concepts. In some embodiments, $\partial$ may be determined by a user, and/or may be configured based on the particular collection and/or library of segments (e.g., some libraries may generally contain relatively long or short articles), such as the relative length of segments in the library, and/or $\partial$ may be configurable. In some embodiments, the purity constant and/or $\partial$ may be a value between zero and one.

At block 1210, presentation module 506 may generate a score and/or rank based on the purity constant, weights of the search concepts in the segment, and/or weights of the other concepts in the segment. For example, presentation module 506 and/or concept indexing system may use the following formula to determine concept intersection ranking:

rank=($\partial$*geometric mean(positive concepts)*number of positive concepts)−(1−$\partial$)*sum(other concepts)

The geometric mean may refer to a type of mean or average, which indicates the central tendency and/or typical value of a set of numbers by using the product of their values (as opposed to the arithmetic mean which uses their sum). The geometric mean may also refer to the nth root of the product of n numbers. A geometric mean may be advantageous in determining intersections of concepts because the geometric mean may encourage similar weighting for both terms and/or concepts. In other words, the highest weight may be achieved when the term weights are equal (for example, one term being twice the weight). Based on the above concept intersection ranking formula, if $\partial$ is one, a high number, and/or infinite, then the purity of segments may be very high, in other words, other concepts may not be allowed in the search results of the concept indexing system. At the other extreme, if $\partial$ is zero, then the ranking of segments may be based solely on the other concepts. In some embodiments, where $\partial$ is set to a number and/or value such as 0.7, 0.8, 0.9, etc., then the concept indexing system may prioritize documents that are predominantly about the positive and/or search concepts, however, the concept indexing system may allow for a smattering of other topics and/or concepts within the identified segments.

Additionally or alternatively, the concept indexing system may use other weighting schemes than a geometric mean to determine concept intersection ranking. Non-limiting examples of weighting schemes, algorithms, and/or formulas include Gini impurity and/or information gain. An example Gini impurity algorithm includes summing the probability of each item being chosen times the probability of a mistake in categorizing that item. Gini impurity may reach its minimum (zero) when all cases in the node (in a decision tree, for example) fall into a single target category.

Gini impurity may be calculated (where $f_i$ is the fraction of items labeled with value i in the set) by:

$$\text{Gini impurity}(f) = \sum_{i=1}^{m} f_i(1-f_i) = \sum_{i=1}^{m}(f_i - f_i^2) = \sum_{i=1}^{m} f_i - \sum_{i=1}^{m} f_i^2 = 1 - \sum_{i=1}^{m} f_i^2$$

Information gain in determining concept intersection rankings may be based on entropy. An example information equation and/or formula may include:

$$\text{Information gain}(f) = -\sum_{i=1}^{m} f_i \log_2 f_i$$

In some embodiments, the concept indexing system and/or concept service 504 may pre-compute and/or cache the concept intersection rankings for segments in concept data store 508. For example, concept service 504 may execute process 1200 to store the various rankings of concepts and/or permutations of concept combinations in concept data store 508. In some embodiments, caching and/or pre-computation of concept intersection rankings may be advantageous to provide faster query response times to the user.

FIG. 13 includes diagrams illustrating example metadata and/or histogram data for concepts, according to some embodiments of the present disclosure. Example diagram 1300 illustrates metadata and/or histogram data associated with a particular concept, such as "United States." For example, the horizontal axis of diagram 1300 corresponds to the number of occurrences of terms and/or keywords associated with a concept and the vertical axis of diagram 1300 corresponds to the number of segments. Thus, diagram 1300 illustrates the number of segments that include a particular number of occurrences of terms and/or keywords associated with the concept "United States." Example diagram 1350 is similar to diagram 1300 except that diagram 1350 is for the concept "Mineral Rights" instead of "United States." The metadata and/or histogram data of diagram 1350 may be contrasted with the histogram data of diagram 1300 because "Mineral Rights" may be a rarer concept than "United States" as illustrated by diagrams 1350 and 1300. As discussed in further detail herein, the concept indexing system, presentation module 506, and/or concept service 504 may use the histogram data for concept weighting and/or ranking, such as determining the weights for concepts during a search of segments based on input from a user specifying multiple search concepts.

Figure 14:
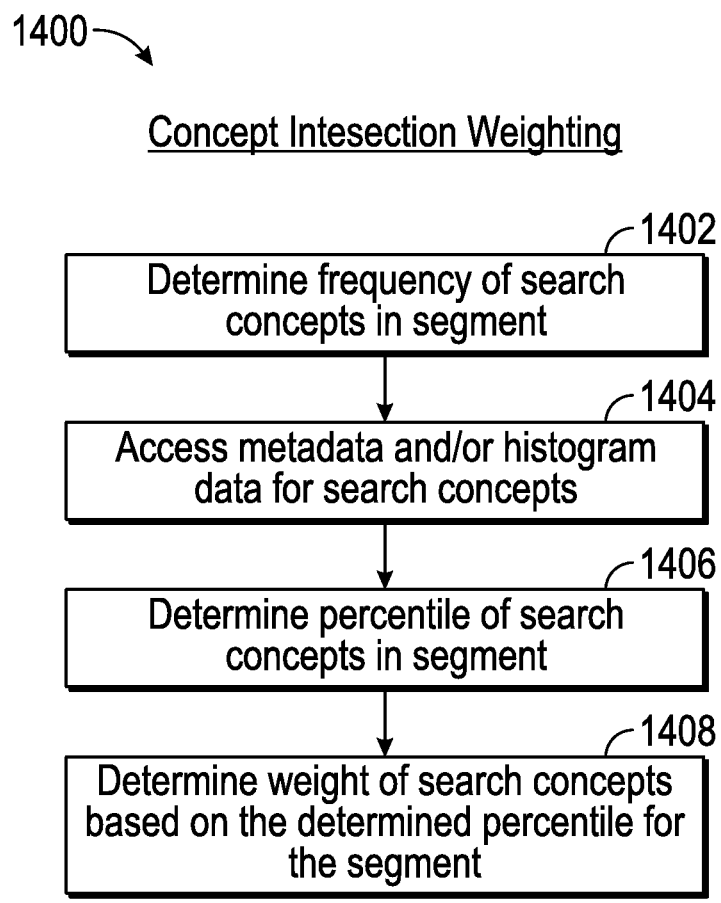
FIG. 14 is a flowchart illustrating an example concept intersection weighting process, according to some embodiments of the present disclosure.

FIG. 14 is a flowchart illustrating an example concept intersection weighting process 1400, according to some embodiments of the present disclosure. The method of FIG. 14 may be performed by the concept indexing system 500 of FIG. 5, such as the various components of FIG. 5 that are discussed above, including concept service 504 and/or presentation module 506. Some or all of the blocks of process 1400 may be executed as part of another process, such as at block 1204 of process 1200 of FIG. 12, which may determine the weights of search concepts. For example, presentation module 506 may execute process 1400 as a part of process 1200 after two or more selected concepts are received in a search query, as illustrated in user interface 100 of FIG. 1. Thus, process 1400 may determine rankings for multiple segments as they are applicable to the combination of the two or more selected concepts. Depending on the embodiment, the method of FIG. 14 may include fewer or additional blocks and/or the blocks may be performed in order different than is illustrated.

Beginning at block 1402, presentation module 506 may determine the frequency of search concepts in one or more segments. As described herein, frequency and/or term frequency may refer to the number of times terms and/or keywords associated with a particular search concept appears in a segment.

At block 1404, presentation module 506 may access metadata and/or histogram data for the search concepts. For example, metadata and/or histogram data associated with search concepts may be illustrated by diagrams 1300 and 1350 of FIG. 13. In some embodiments, the metadata and/or histogram data or search concepts may be loaded into memory, such as the memory module 1908 of the concept indexing system 500.

At block 1406, presentation module 506 may determine a percentile and/or ranking of the search concepts to segments based on the metadata and/or histogram data. In some embodiments, presentation module 506 iterates through a collection of segments and determines the percentile rankings of search concepts for each segment of the collection of segments. For example, assume the accessed and/or received search concepts are "United States" and "Mineral Rights." Continuing with the example, diagrams 1300 and 1350 of FIG. 13 illustrate the respective percentiles of the two search concepts for the library of segments. More specifically, presentation module 506 iterates through a collection of queried segments to identify the percentiles of a particular segment, segment 1310A-B. In particular, the example diagram 1300 of FIG. 13 illustrates that segment 1310A has approximately 13 occurrences of terms and/or keywords associated with the search concept "United States." Moreover, histogram data of diagram 1300 further indicates a ranking and/or percentile of segment 1310A within the collection as being within the $30^{th}$ percentile of segments containing the search concept "United States," for example. As mentioned, in this example segment, 1310A is similar to segment 1310B except that segment 1310B within diagram 1350 indicates the number of occurrences of a different search concept within segment 1310A-B. For example, segment 1310B of diagram 1350 indicates that segment 1310B is within the $90^{th}$ percentile of segments containing the search concept "Mineral Rights."

At block 1408, presentation module 506 may determine the weight for multiple search concepts based on the respective determined percentiles for the search concepts in the segment. Continuing with the example from above, for the same segment 1310A-B, presentation module 506 may assign a higher weight to search concept "Mineral Rights" than search concept "United States" because of the higher percentile ranking of the search concept "Mineral Rights." In some embodiments, the weighting of particular search concepts may be determined by multiplying term frequency by the determined percentile. For example, presentation module 506 may access data corresponding to diagrams 1300 and 1350, and determine a weighting of the $30^{th}$ percentile of 14 keywords (0.3*14 keywords or 4.2) for "United States" and a weighting of $90^{th}$ percentile of 25 keywords (25*0.9 or 22.5) for "Mineral Rights" for the segment 1310A-B. Continuing with the example and according to some embodiments herein, another segment with weightings of 5 and 4.2 for "United States" and "Mineral Rights" would have a lower ranking than segment 1310A-B. As described herein, the metadata and/or histogram data may indicate how common or rare search concepts are to determine their importance during search queries. Thus, weights for search concepts may be properly scaled based on their respective histogram data. The determination of weights for search concepts by process 1400 may be combined with the geometric mean calculation to determine concept intersection rankings as described with respect to process 1200 of FIG. 12. In some embodiments, the histogram-based ranking of search results, as described herein, may be used for searches of a single concept. Thus, presentation module 506 may implement process 1400 to determine respective weights for search concepts during concept intersection ranking by using metadata, empirical distributions, and/or histogram data.

FIG. 15 illustrates an example document 1500 that may be processed and/or analyzed by the concept indexing system and/or another module or service described herein. Document 1500 may be processed by the concept service 504 by executing any of the processes described herein, such as process 600 of FIG. 6, process 1100 of FIG. 11, and/or process 1200 of FIG. 12.

Additionally or alternatively to process 1200 of FIG. 12, presentation module 506 may rank segments for the intersection of multiple concepts based on determining a statistical likelihood that the multiple concepts are conceptually related in a segment. For example, as illustrated by segment 1510 of FIG. 15, concept service 504 may process the document 1500 to identify keywords 1502A-I and 1504A-E. Keywords 1502A-I may correspond to the search concept "Mineral Rights" and keywords 1504A-E may correspond to the search concept "United States." Presentation module 506 may process a multiple search concept request by ranking segment 1510 based on the position and/or distribution of keywords within segment 1510. An example method for determining a statistical indicator of conceptual relatedness may be an average distance, such as a distance in words, between keywords associated with respective concepts from the multiple concept search request. For example, there may be three words between keyword "law" 1502A (associated with concept "Mineral Rights") and keyword "Alaska" 1504B (associated with concept "United States"), twenty-four words between keyword "Alaska" 1504B (associated with concept "United States") and keyword "coal" 1502B (associated with concept "Mineral Rights"), etc. In some embodiments, segments with lower average word distances may be ranked as more conceptually related by presentation module 506. Another example method for determining a statistical indicator of the relatedness of two or more concepts may be by breaking the segment into portions and determining how many portions and/or a percentage of the segment that have keywords associated with two or more search concepts. In some embodiments, the portion sizes may be a configurable length such as ten, thirteen, or twenty words. For example, presentation module 506 may determine that portion 1506, consisting of thirteen words, has two concepts present ("Mineral Rights" and "United States"), while portion 1508 does not have any keywords associated with the current search concepts ("Mineral Rights" and "United States"). If the remainder of the segment was similar to portions 1506 and 1508, the presentation module may assign a conceptual relatedness ranking of 0.5 to the segment because half of the portions had terms associated with the search concepts. Thus, in some embodiments, the concept indexing system may use one or more methods, such as average distance and/or breaking the segment into portions, for generating a statistical likelihood that a segment is "about" two or more search concepts.

Figure 16:
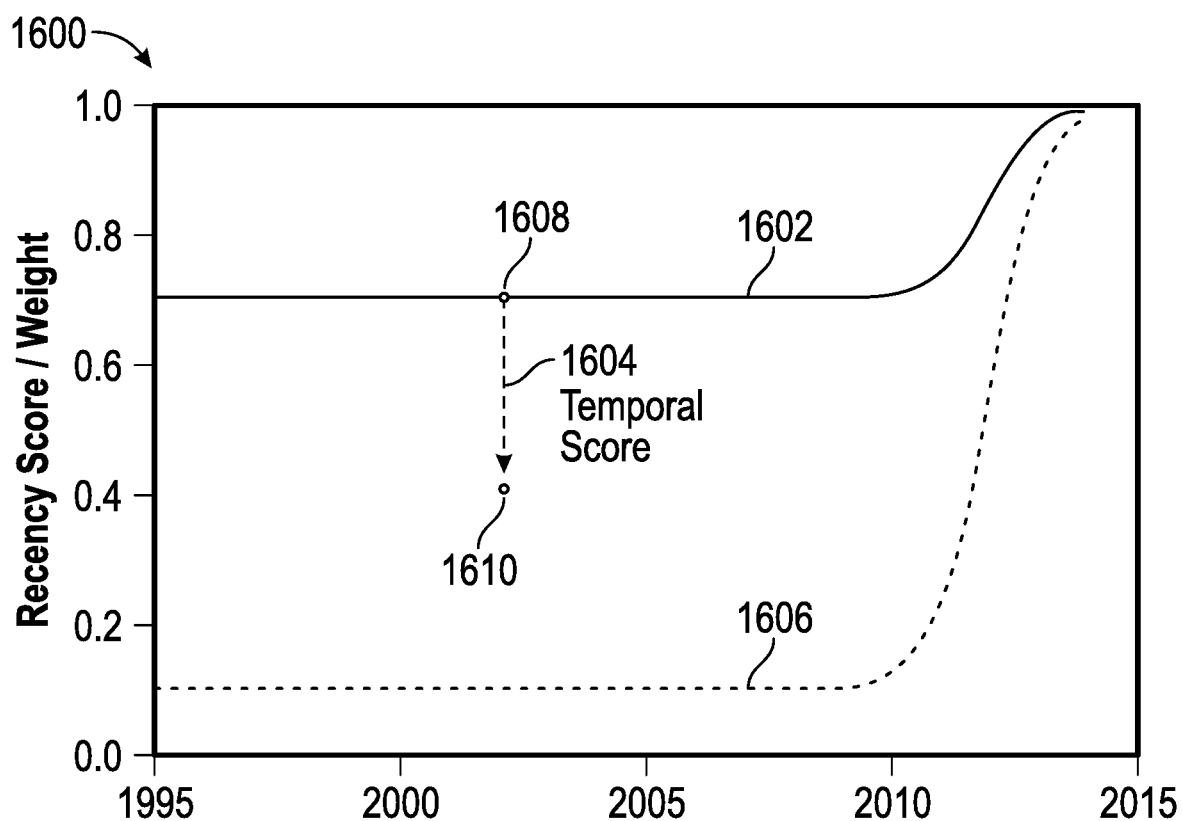
FIG. 16 is a diagram illustrating example decay functions to determine a recency score, according to some embodiments of the present disclosure.

FIG. 16 is a diagram illustrating example decay functions to determine a recency score, according to some embodiments of the present disclosure. Example diagram 1600 may illustrate how decay functions may be used to rank search results in a concept indexing system. For example, the concept results indexing system and/or data store may include a large collection of documents and/or segments spanning many months or years, such as thirty, forty, fifty, a hundred years, etc. Thus, it may be advantageous for the concept indexing system to present more recent results and/or segments more frequently and/or with higher rankings. In some embodiments, the publication date of a segment may be used to determine the recency, freshness, and/or staleness of a segment. One approach to achieving this result is to use a decay function, such as a logistic function that prioritizes more recent results and decays older results based on an input date. However, as described herein, there may be at least two types of documents and/or segments in a library, such as segments that are more basic and/or fundamental in contrast with more temporal segments. Thus, using a single logistic decay function, for example, may be disadvantageous in not being able to distinguish between the two or more types of segments. For example, a user may be more interested in a segment that includes more fundamental topics related to a provided concept, even if it is older, so long as the segments isn't specific to that time period (e.g., includes ideas or analysis that may be outdated). Therefore, improved decay functions may take into account different types of documents, which is in contrast with a single decay function that may be too blunt of an instrument. However, in other embodiments, using a single decay function may be sufficient for the particular use case and/or requirements of a group and/or set of users.

One example of an improved recency and decay function is illustrated by diagram 1600. In this example, for a particular segment an initial recency score 1608 may be determined based on a decay function 1602. In some embodiments, an input to the decay function 1602 may be a date, such as the publication date and/or some other date associated with the segment, for example. The initial recency score 1608 may be adjusted by a temporal score 1604. The temporal score 1604 may indicate how "temporal" a segment is, which may be based on the number of temporal words in the segment, which will be discussed in further detail with reference to FIG. 18 below. A final recency score 1610 a segment may be determined based on adjusting and/or subtracting the initial recency score 1608 by the temporal score 1604. A second decay function 1606 may function as a floor of the recency score. For example, if the temporal score of the segment is very high, then adjusting the recency score by the temporal score may cause the recency score to be close to zero, such as 0.0001 (without a floor). Thus, the second decay function 1606 may establish an absolute minimum recency score for the particular input date and/or time. In other words, using a floor function may indicate that no matter how "temporal" a segment is, the segment should have some threshold level of relevance to a user. For example, a user may be interested in a particular event that is associated with the date and a response to the user query may include the result (even though it may be lower ranked compared to other results).

Figure 17A:
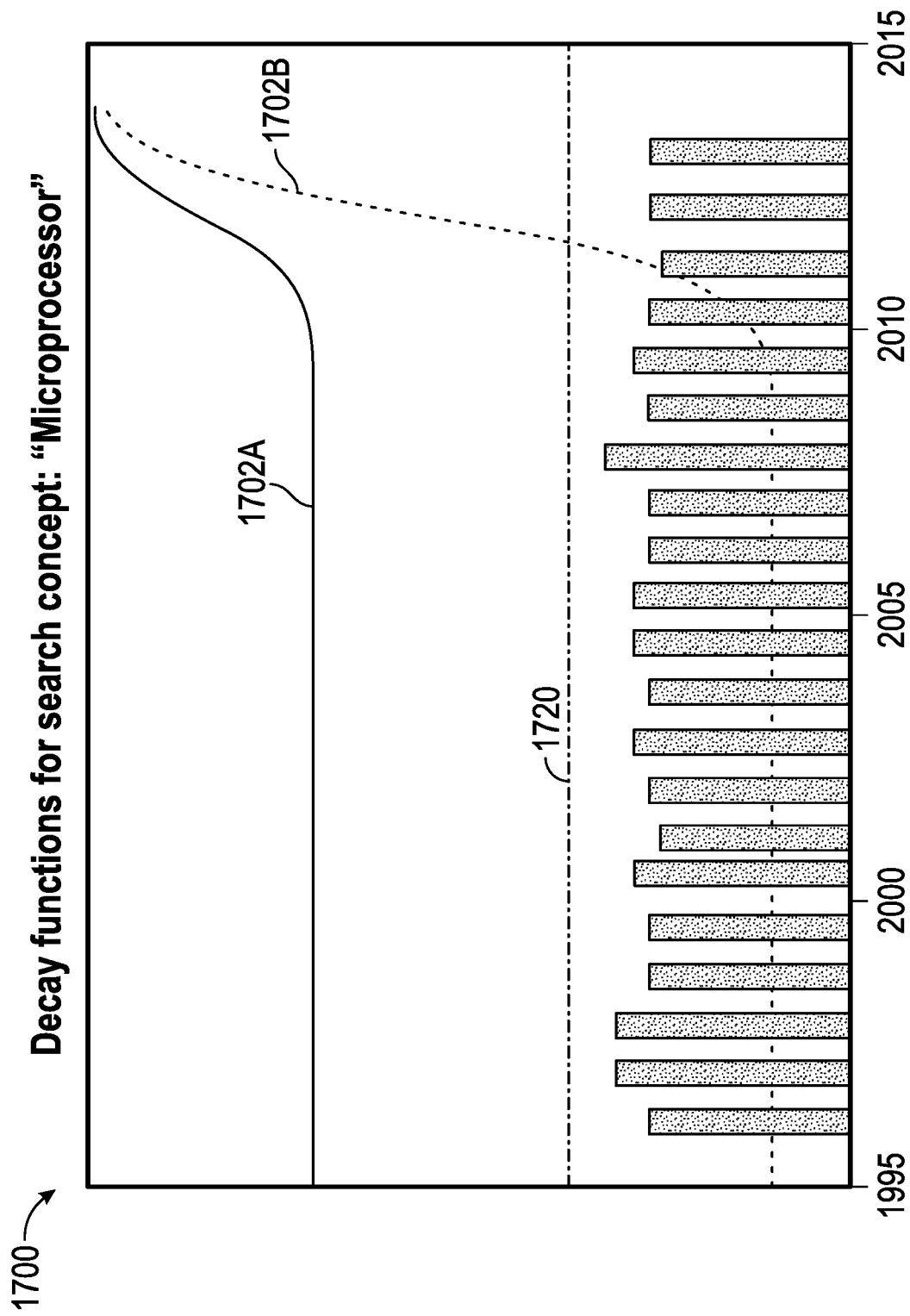
FIGS. 17A-B are diagrams illustrating additional example decay functions to determine a recency score, according to some embodiments of the present disclosure.
Figure 17B:
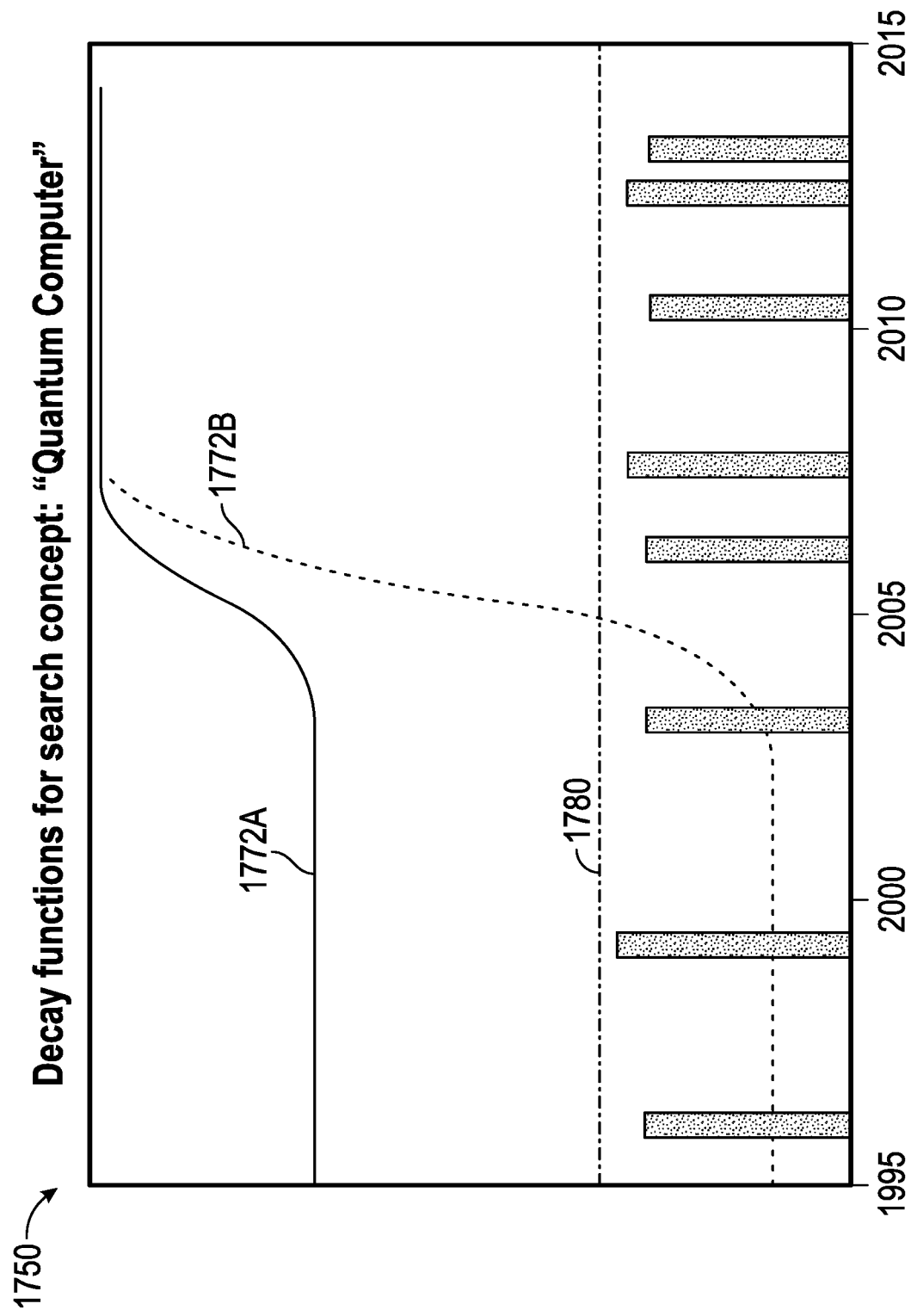

FIGS. 17A and 17B are diagrams illustrating alternate example logistic and/or decay functions to determine a recency score, according to some embodiments of the present disclosure. In the example diagrams 1700 and 1750, decay functions 1702A-B and 1772A-B may be similar to decay functions 1602 and 1606 of FIG. 16. However, the concept indexing system and/or concept service may use different decay functions based at least on metadata and/or histograms regarding the density and/or frequency of particular concepts within segments. Metadata and/or histograms 1720 and 1780 may indicate the number of segments per time unit that include, match, and/or associated with the search concept. For example, metadata and/or histogram 1720 may indicate the number of segments per time unit that include, match, and/or associated with the search concept "Microprocessor." In the example, the histogram data may indicate that segments associated with "Microprocessor" include 100 segments for December 2001, 110 segments for January 2002, 115 segments for February 2002, etc. Example metadata and/or histogram 1780 may indicate a lower density or frequency and/or a "rarer" search concept, "Quantum Computer" within the segments. Thus, the concept indexing system and/or concept service may use a different decay function based on a particular search concept and its corresponding metadata and/or histogram data. As illustrated, the decay functions 1772A-B, which corresponds to the search concept "Quantum Computer," may be more lenient than decay functions 1702A-B because of the "rarity" of the search concept "Quantum Computer." In contrast, the search concept "Microprocessor" may be more ubiquitous among segments and the concept indexing system and/or concept service may use less lenient decay functions 1702A-B.

Figure 18:
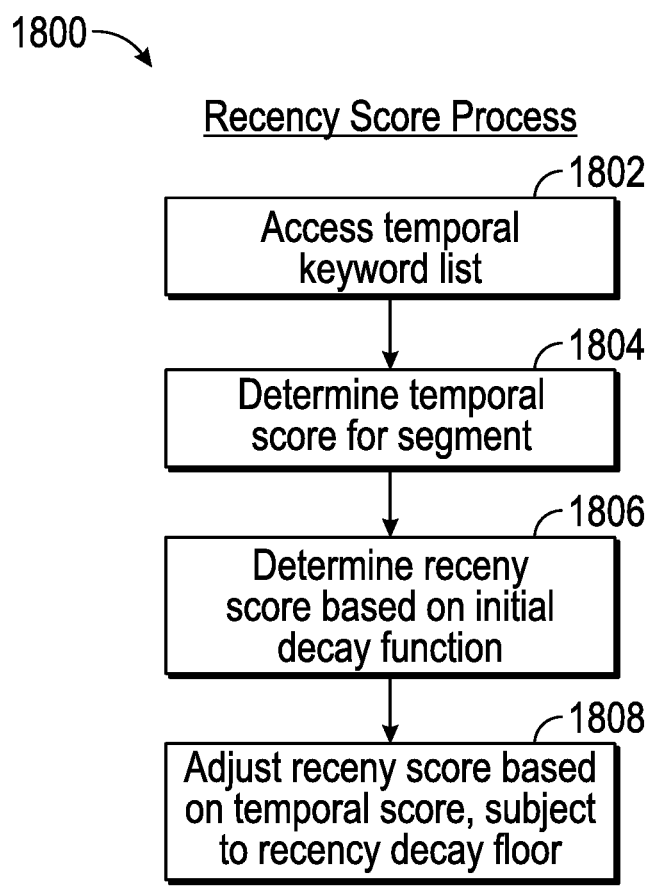
FIG. 18 is a flowchart illustrating an example recency scoring process, according to some embodiments of the present disclosure.

FIG. 18 is a flowchart illustrating an example recency scoring process 1800, according to some embodiments of the present disclosure. The method of FIG. 18 may be performed by the concept indexing system 500 of FIG. 5, such as the various components of FIG. 5 that are discussed above, including concept service 504 and/or presentation module 506. For example, concept service 504 may implement process 1800 to measure the temporalness of a segment by evaluating the percentage and/or number of "time-bound" and/or temporal words in the segment, such as "current," "yesterday," "Tuesday," "March," "2007" in the text, for example. Concept service 504 may use a percentage and/or recency score to choose a point between two decay functions illustrated in FIG. 16, where one function may be more aggressive and the other one much more lenient. The decay functions may be viewed as priors on confidence of relevance of old segments and newer segments. As described herein, older more fundamental and/or basic segments are much more likely to be relevant to and/or of interest to a user than older temporal segments. Depending on the embodiment, the method of FIG. 18 may include fewer or additional blocks and/or the blocks may be performed in order different than is illustrated.

Beginning at block 1802, concept service 504 accesses a list of temporal words and/or keywords. Temporal keywords may be words associated with time, such as a date, time of day, week, month, or year. Non-limiting example temporal keywords include "current," "yesterday," "Tuesday," "March," "2007," "Jan. 1, 1998," "2014-12-02," or any other word and/or text associated with time. In some embodiments, an initial temporal keyword list may be selected and/or determined by a user. In some embodiments, the machine learning techniques described herein may be used by concept service 504 to improve the temporal keyword list. For example, segments matching the initial keyword list may be used as a training set to generate an expanded list of temporal keywords.

At block 1804, concept service 504 determines a temporal score for the segment. The temporal score and/or measurement of the temporalness of the segment may be based on the density of temporal words in the segment. An example ratio and/or equation to determine the temporal density of the segment is a number and/or quantity of temporal words divided by segment length. As used herein, segment length may be the number of words in her characters in the segment.

At block 1806, concept service 504 may determine an initial recency score based on an initial decay function. For example, the initial decay function may be a logistic function, such as the decay function 1602 of FIG. 16. Thus, if a segment has a publication date in the year 2002, for example, then concept service 504 may assign an initial recency score 1608 to the segment of approximately 0.7 as illustrated in FIG. 16.

At block 1808, the recency score may be adjusted based on a temporal score, which may be subject to a recency decay floor. Concept service 504 may adjust the recency score based on the temporal score determined in block 1804. In some embodiments adjusting the recency score may include subtracting the initial recency score, determined at block 1806, by the temporal score. However, concept service 504 may adjust the recency score subject to a second decay function, which may act as a floor. For example, as illustrated in FIG. 16, the second decay function 1606 may act as a floor and/or minimum for the final recency score. For example, for a segment with a date older than 2009 the lowest recency score the segment may receive may be approximately 0.1. In other embodiments, adjusting the recency score and/or determining a final recency score may include selecting a point between the two decay functions based on the temporal score.

In some embodiments, concept service 504 may use other decay functions and/or combinations of decay functions. While two decay functions are used as an example herein, in some embodiments, concept service 504 may use more than two decay functions to rank and/or score segments. For example, n types and/or categories of segments (e.g., fundamental, temporal, news article, treatise, research paper, etc.) may be associated with n recency decay functions. In some embodiments, the temporal scoring and/or logistic decay functions may be configurable by a user. For example, a user may specify and/or indicate the importance of temporal segments and the concept indexing system's decay functions and/or process 1800 may be adjusted based on user preferences. In some embodiments, instead of adjusting a recency score by the temporal score the temporal score may be used by concept service as a threshold and/or indicator for selecting between or among two or more recency decay functions to calculate a recency score for a segment with the selected recency decay function.

In some embodiments, concept service 504 may select and/or determine decay functions based on metadata associated with particular search concepts. As described herein, metadata and/or histogram data may include the number of segments associated with a particular search concept appear per some time unit as illustrated by histogram data 1700 and 1750 of FIGS. 17A and 17B, respectively. Concept service 504 may access and/or select pre-existing decay functions based on the respective histogram data for a particular search concept. For example, concept service 504 may choose between the decay function set 1702A-B or the decay function set 1772A-B of FIGS. 17A and 17B, respectively, based on their respective histogram data being within one or more pre-existing thresholds. In other embodiments, concept service 504 may dynamically determine decay functions based on the histogram data. For example, concept service 504 may determine decay functions 1702A-B and 1772A-B by starting with one or more base decay functions, such as decay functions 1602 and 1606 of FIG. 16, and adjusting the one or more base decay functions based on respective histogram data. Continuing with the example, concept service 504 may adjust a base decay function to be more lenient based on the histogram data indicating a rarer search concept and/or may adjust the base decay function to be more strict based on the histogram data indicating a more common search concept among segments. In some embodiments, concept service 504 may determine a multiplication factor based on the histogram data. The concept service 504 may then adjust the base decay function by multiplying the base function by the determined factor. Thus, concept service 504 may determine customized decay functions for particular search concepts, such as customizing decay functions based on the density of segments for particular search concepts.

In some embodiments, instead of a decay based on time, decay functions may be used for other metadata associated with segments. A logistic decay function may be used by the concept indexing system for term decay and/or segment length decay. For example, a shorter paragraph and/or segment may have a very high ranking and/or scoring for a particular search concept. However, users may not be interested in the shorter segments, and similar to decay functions based on time, if a segment is below a particular length and/or word count threshold, the ranking of the segment may drop dramatically based on a decay term function. In some embodiments, a single and/or multiple term logistic decay functions may be used by the concept indexing system to rank documents. Also, similar to time decay that may be configurable, term decay may also be configurable by the user.

Implementation Mechanisms

The various computing device(s) discussed herein, such as the concept indexing system 500, concept service 504, presentation module 506, and/or user computing device 502, are generally controlled and coordinated by operating system software, such as, but not limited to, iOS, Android, Chrome OS, Windows XP, Windows Vista, Windows 7, Windows 8, Windows Server, Windows CE, Unix, Linux, SunOS, Solaris, Macintosh OS X, VxWorks, or other compatible operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things. The concept indexing system 500 may be hosted and/or executed on one or more computing devices with one or more hardware processors and with any of the previously mentioned operating system software.

Figure 19:
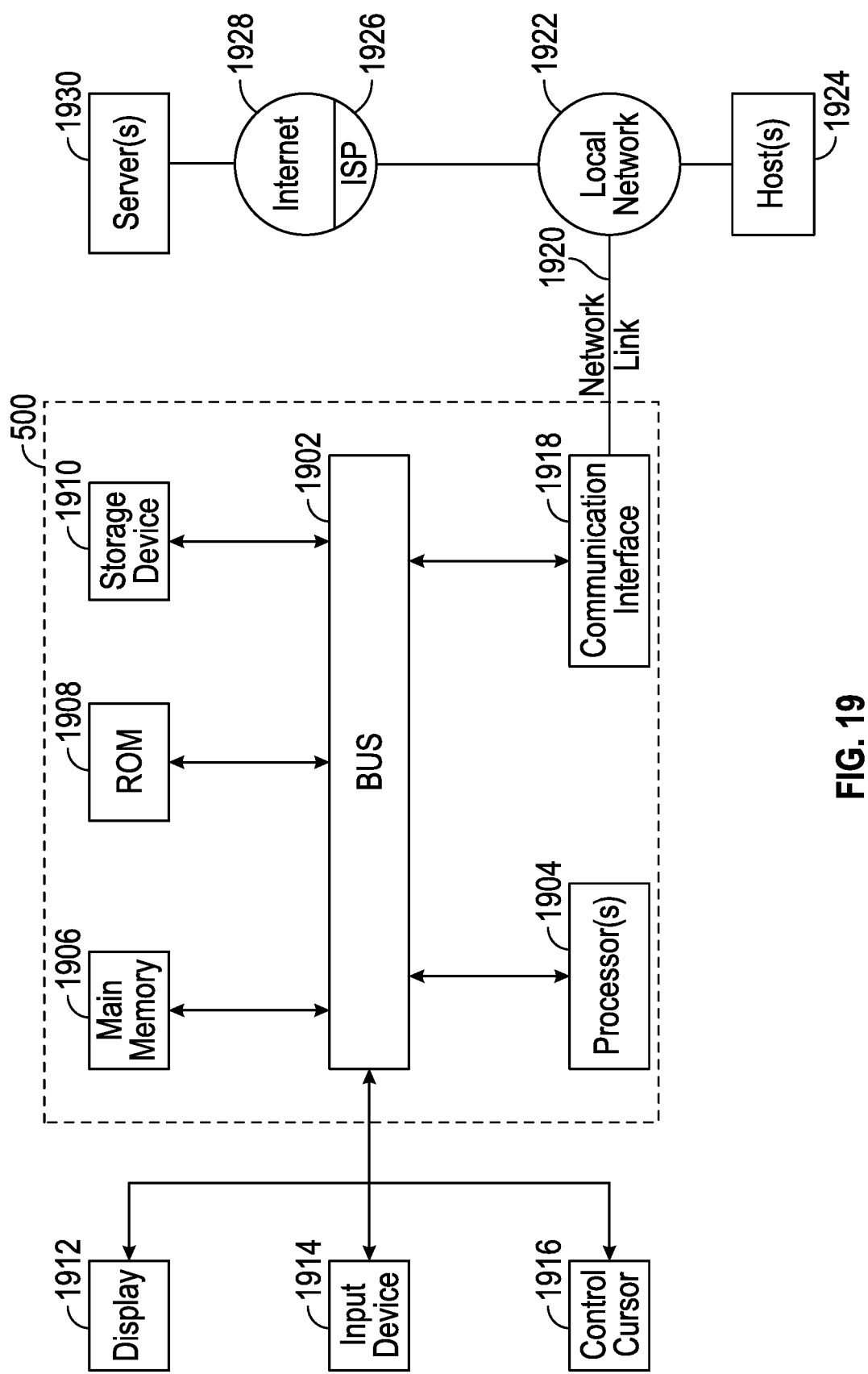
FIG. 19 is a diagram illustrating a computer system with which certain embodiments discussed herein may be implemented.

FIG. 19 is a block diagram that illustrates example components of the concept indexing system 500. While FIG. 19 refers to the concept indexing system 500, any of the other computing devices, modules, services, and/or user computing devices discussed herein may have some or all of the same or similar components.

The concept indexing system 500 may execute software, e.g., standalone software applications, applications within browsers, network applications, etc., whether by the particular application, the operating system, or otherwise. Any of the systems discussed herein may be performed by the concept indexing system 500 and/or a similar computing system having some or all of the components discussed with reference to FIG. 19.

The concept indexing system 500 includes a bus 1902 or other communication mechanism for communicating information, and a hardware processor, or multiple processors, 1904 coupled with bus 1902 for processing information. Hardware processor(s) 1904 may be, for example, one or more general purpose microprocessors.

The concept indexing system 500 also includes a main memory 1906, such as a random access memory (RAM), cache and/or other dynamic storage devices, coupled to bus 1902 for storing information and instructions to be executed by processor(s) 1904. Main memory 1906 also may be used for storing temporary variables or other intermediate information during execution of instructions to be executed by processor(s) 1904. Such instructions, when stored in storage media accessible to processor(s) 1904, render the concept indexing system 500 into a special-purpose machine that is customized to perform the operations specified in the instructions. Such instructions, as executed by hardware processors, may implement the methods and systems described herein for indexing documents and/or segments.

The concept indexing system 500 further includes a read only memory (ROM) 1908 or other static storage device coupled to bus 1902 for storing static information and instructions for processor(s) 1904. A storage device 1910, such as a magnetic disk, optical disk, or USB thumb drive (Flash drive), etc., is provided and coupled to bus 1902 for storing information and instructions. The presentation module 506, concept service 504, and/or concept data store 504 of FIG. 5 may be stored on the main memory 1906 and/or the storage device 1910.

In some embodiments, the concept data store 504 of FIG. 5 is a file system, relational database such as, but not limited to, MySql, Oracle, Sybase, or DB2, and/or a distributed in memory caching system such as, but not limited to, Memcache, Memcached, or Java Caching System.

The concept indexing system 500 and/or user computing device 502 may be coupled via bus 1902 to a display 1912, such as a cathode ray tube (CRT) or LCD display or touch screen, for displaying information to a computer user. An input device 1914 is coupled to bus 1002 for communicating information and command selections to processor 1904. One type of input device 1914 is a keyboard including alphanumeric and other keys. Another type of input device 1914 is a touch screen. Another type of user input device is cursor control 1916, such as a mouse, a trackball, a touch screen, or cursor direction keys for communicating direction information and command selections to processor 1904 and for controlling cursor movement on display 1912. This input device may have two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The concept indexing system 500 may include a presentation module to implement a GUI, for example, FIGS. 1 and/or 2, which may be stored in a mass storage device as executable software codes that are executed by the computing device(s). This and other units may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "instructions," as used herein, refers to logic embodied in hardware or firmware, or to a collection of software units, possibly having entry and exit points, written in a programming language, such as, but not limited to, Java, Lua, C, C++, or C #. A software unit may be compiled and linked into an executable program, installed in a dynamic link library, or may be written in an interpreted programming language such as, but not limited to, BASIC, Perl, or Python. It will be appreciated that software units may be callable from other units or from themselves, and/or may be invoked in response to detected events or interrupts. Software units configured for execution on computing devices by their hardware processor(s) may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. Generally, the instructions described herein refer to logical modules that may be combined with other modules or divided into sub-modules despite their physical organization or storage.

The concept indexing system 500, or components of it, such as the presentation module 506 and/or the concept service 504 of FIG. 5, may be programmed, via executable code instructions, in a programming language.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1910. Volatile media includes dynamic memory, such as main memory 1906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1902. Transmission media can also take the form of acoustic or light waves, such as those generated during radio-wave and infra-red data communications.

Various forms of media may be involved in carrying one or more sequences of one or more instructions to processor(s) 1904 for execution. For example, the instructions may initially be carried on a magnetic disk or solid state drive of a remote computer. The remote computer may load the instructions into its dynamic memory and send the instructions over a telephone or cable line using a modem. A modem local to the concept indexing system 500 may receive the data on the telephone or cable line and use an infra-red transmitter to convert the data to an infra-red signal. An infra-red detector can receive the data carried in the infra-red signal and appropriate circuitry can place the data on bus 1902. Bus 1902 carries the data to main memory 1906, from which the processor(s) 1904 retrieves and executes the instructions. The instructions received by main memory 1906 may retrieve and execute the instructions. The instructions received by main memory 1906 may optionally be stored on storage device 1910 either before or after execution by processor(s) 1904.

The concept indexing system 500 also includes a communication interface 1918 coupled to bus 1902. Communication interface 1918 provides a two-way data communication coupling to a network link 1920 that is connected to a local network 1922. For example, communication interface 1918 may be an integrated services digital network (ISDN) card, cable modem, satellite modem, or a modem to provide a data communication connection to a corresponding type of telephone line. As another example, communication interface 1918 may be a local area network (LAN) card to provide a data communication connection to a compatible LAN (or WAN component to be communicated with a WAN). Wireless links may also be implemented. In any such implementation, communication interface 1918 sends and receives electrical, electromagnetic or optical signals that carry digital data streams representing various types of information.

Network link 1920 typically provides data communication through one or more networks to other data devices. For example, network link 1920 may provide a connection through local network 1922 to a host computer 1924 or to data equipment operated by an Internet Service Provider (ISP) 1926. ISP 1926 in turn provides data communication services through the world wide packet data communication network now commonly referred to as the "Internet" 1928. Local network 1922 and Internet 1928 both use electrical, electromagnetic or optical signals that carry digital data streams. The signals through the various networks and the signals on network link 1920 and through communication interface 1918, which carry the digital data to and from the concept indexing system 500, are example forms of transmission media.

A network, such as the network 560 of FIG. 5, may comprise, but is not limited to, one or more local area networks, wide area network, wireless local area network, wireless wide area network, the Internet, or any combination thereof.

The concept indexing system 500 can send messages and receive data, including program code, through the network(s), network link 1920 and communication interface 1918. In the Internet example, a server 1930 might transmit a requested code for an application program through Internet 1928, ISP 1926, local network 1922 and communication interface 1918.

The received code may be executed by processor(s) 1904 as it is received, and/or stored in storage device 1910, or other non-volatile storage for later execution.

In some embodiments, the concept indexing system 500 may operate in a distributed computing environment including several computer systems that are interconnected using one or more computer networks. The concept indexing system 500 could also operate within a computing environment having a fewer or greater number of devices than are illustrated in FIG. 5 and/or FIG. 19. Thus, the depiction of concept indexing system 500 in FIG. 5 and/or FIG. 19 should be taken as illustrative and not limiting to the present disclosure. For example, the concept indexing system 500 could implement various Web services components and/or peer-to-peer network configurations to implement at least a portion of the processes described herein. For example, multiple servers and/or processes may process documents and/or segments in a distributed manner to expedite the processing of a library and/or collection of documents.

It will be appreciated that while the present disclosure discusses concept indexing process with respect to processing and/or analyzing segments, the systems and methods described herein may be used for documents as well.

Each of the processes, methods, and algorithms described in the preceding sections may be embodied in, and fully or partially automated by, code instructions executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing units, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computing system for identifying segments of interest in documents, the computing system including:
   one or more hardware computer processors configured to execute software instructions; and
   one or more storage devices storing software instructions configured for execution by the one or more hardware computer processors to cause the computing system to:
   identify a plurality of segments within a plurality of documents;
   receive, via a user interface, a user selection of a plurality of concepts, wherein each concept is associated with one or more concept keywords;
   for each segment:
      determine statistical likelihoods that the respective segment is associated with respective concepts of the plurality of concepts;
      determine a first set of weights for the plurality of concepts for the respective segment, wherein the first set of weights indicates relative importance of the plurality of concepts to the respective segment; and
      determine a second weight for a concept that is excluded from the plurality of concepts for the respective segment;
   determine a ranked listing of one or more segments being associated with the plurality of concepts based at least in part on, for each segment, the statistical likelihoods, the first set of weights, and the second weight; and
   present the ranked listing in the user interface.

2. The computing system according to claim 1, wherein the ranked listing is further determined based on a recency score associated with the one or more segments.

3. The computing system of claim 2, wherein execution of further software instructions by the one or more hardware computer processors further cause the computing system to:
   calculate the recency score, wherein calculating the recency score comprises:
      determining a time associated with a first segment; and
      applying a decay function to the time to determine the recency score.

4. The computing system of claim 1, wherein the plurality of concepts comprises a first concept and a second concept, wherein determining the first set of weights for the plurality of concepts for the respective segment further comprises:
   determining a first quantity of occurrences of the first concept in the respective segment, and a second quantity of occurrences of the second concept in the respective segment;
   calculating a first weight based at least in part on the first quantity of occurrences; and calculating a third weight based at least in part on the second quantity of occurrences.

5. The computing system of claim 4, wherein determining the first quantity of occurrences is based at least on a quantity of keywords associated with the first concept in the respective segment.

6. A non-transitory computer storage medium storing computer executable instructions that when executed by a computer hardware processor perform operations comprising:
    identifying a plurality of segments within a plurality of documents;
    receiving, via a user interface, a user selection of a plurality of concepts, wherein each concept is associated with one or more concept keywords;
    for each segment:
        determining statistical likelihoods that the respective segment is associated with respective concepts of the plurality of concepts;
        determining a first set of weights for the plurality of concepts for the respective segment, wherein the first set of weights indicates relative importance of the plurality of concepts to the respective segment; and
        determining a second weight for a concept that is excluded from the plurality of concepts for the respective segment;
    determining a ranked listing of one or more segments being associated with the plurality of concepts based at least in part on, for each segment, the statistical likelihoods, the first set of weights, and the second weight; and
    presenting the ranked listing in the user interface.

7. The non-transitory computer storage medium of claim 6 storing further computer executable instructions that when executed by the computer hardware processor perform further operations comprising:
    calculating the recency score, wherein calculating the recency score comprises:
        determining a time associated with a first segment; and
        applying a decay function to the time to determine the recency score.

8. The non-transitory computer storage medium of claim 6, wherein the plurality of concepts comprises a first concept and a second concept, wherein determining the first set of weights for the plurality of concepts for the respective segment further comprises:
    determining a first quantity of occurrences of the first concept in the respective segment, and a second quantity of occurrences of the second concept in the respective segment;
    calculating a first weight based at least in part on the first quantity of occurrences; and
    calculating a third weight based at least in part on the second quantity of occurrences.

9. The non-transitory computer storage medium of claim 8, wherein determining the first quantity of occurrences is based at least on a quantity of keywords associated with the first concept in the respective segment.

10. A computer-implemented method comprising:
    identifying a plurality of segments within a plurality of documents;
    receiving, via a user interface, a user selection of a plurality of concepts, wherein each concept is associated with one or more concept keywords;
    for each segment:
        determining statistical likelihoods that the respective segment is associated with respective concepts of the plurality of concepts;
        determining a first set of weights for the plurality of concepts for the respective segment, wherein the first set of weights indicates relative importance of the plurality of concepts to the respective segment; and
        determining a second weight for a concept that is excluded from the plurality of concepts for the respective segment;
    determining a ranked listing of one or more segments being associated with the plurality of concepts based at least in part on, for each segment, the statistical likelihoods, the first set of weights, and the second weight; and
    presenting the ranked listing in the user interface.

11. The computer-implemented method according to claim 10, wherein the ranked listing is further determined based on a recency score associated with the one or more segments.

12. The computer-implemented method according to claim 10, further comprising:
    calculating the recency score, wherein calculating the recency score comprises:
        determining a time associated with a first segment; and
        applying a decay function to the time to determine the recency score.

13. The computer-implemented method according to claim 10, wherein the plurality of concepts comprises a first concept and a second concept, wherein determining the first set of weights for the plurality of concepts for the respective segment further comprises:
    determining a first quantity of occurrences of the first concept in the respective segment, and a second quantity of occurrences of the second concept in the respective segment;
    calculating a first weight based at least in part on the first quantity of occurrences; and
    calculating a third weight based at least in part on the second quantity of occurrences.

14. The computer-implemented method according to claim 13, wherein determining the first quantity of occurrences is based at least on a quantity of keywords associated with the first concept in the respective segment.

* * * * *